United States Patent
Wilson et al.

(10) Patent No.: US 9,455,101 B2
(45) Date of Patent: Sep. 27, 2016

(54) OPTICALLY TRANSMISSIVE KEY ASSEMBLIES FOR DISPLAY-CAPABLE KEYBOARDS, KEYPADS, OR OTHER USER INPUT DEVICES

(75) Inventors: John Wilson, San Francisco, CA (US); Robert Garrett, San Francisco, CA (US); Aaron Julin, Oakland, CA (US)

(73) Assignee: RAZER (ASIA-PACIFIC) PTE LTD, Singapore (SG)

( * ) Notice: Subject to any disclaimer, the term of this patent is extended or adjusted under 35 U.S.C. 154(b) by 65 days.

(21) Appl. No.: 13/978,247

(22) PCT Filed: Jan. 5, 2011

(86) PCT No.: PCT/US2011/020214
§ 371 (c)(1),
(2), (4) Date: Feb. 11, 2014

(87) PCT Pub. No.: WO2012/094002
PCT Pub. Date: Jul. 12, 2012

(65) Prior Publication Data
US 2014/0144764 A1 May 29, 2014

(51) Int. Cl.
*H01H 9/00* (2006.01)
*H01H 9/16* (2006.01)
(Continued)

(52) U.S. Cl.
CPC ............ *H01H 9/161* (2013.01); *G06F 3/0219* (2013.01); *G06F 3/0238* (2013.01);
(Continued)

(58) Field of Classification Search
CPC ... H01L 43/00; G06F 3/0219; G06F 3/0238; G06F 3/03543; G06F 2200/1612; H01H 9/161; H01H 13/83; H01H 3/125; H01H 2235/028; H01H 2219/066; H01H 2219/06; H01H 2219/056
USPC ................. 335/205–207, 302, 306; 200/5 R, 200/308–310, 334; 257/421
See application file for complete search history.

(56) References Cited

U.S. PATENT DOCUMENTS 4,480,932 A * 11/1984 Willcox ........................ 400/82
5,597,067 A * 1/1997 Yoneyama .................... 200/344
(Continued)

FOREIGN PATENT DOCUMENTS

CN 1862732 A 11/2006
EP 1722385 A1 11/2006
(Continued)

OTHER PUBLICATIONS

"International Search Report and Written Opinion dated Oct. 27, 2011," International Application No. PCT/US2011/020214, 7 pages.
(Continued)

*Primary Examiner* — Bernard Rojas
(74) *Attorney, Agent, or Firm* — Polsinelli PC

(57) ABSTRACT

A key that includes a body with an optically transmissive or light permeable region and an optical film coupled to or carried by the light permeable region. The key also includes a resilient structure coupled to the body. The key can be assembled or coupled to, or disposed relative or adjacent to, a display screen. The key also includes a switch actuator (e.g., an electromechanical switch actuator or contact element). Displacement of the key, more specifically the body of the key, displaces the switch actuator for actuating a switch. The resilient structure is configured to bias the body at a first position. The body can be actuated or displaced from the first position to a second position for effectuating corresponding displacement of the switch actuator and actuation of the switch. The resilient structure provides or establishes a positive tactile feedback upon user-directed or user-controlled actuation or displacement of the body. The resilient structure and/or the switch actuator is positioned and configured to minimize, reduce, or eliminate obstruction of light transmission through the light permeable region of the body.

19 Claims, 12 Drawing Sheets

(51) Int. Cl.
*G06F 3/02* (2006.01)
*G06F 3/023* (2006.01)
*G06F 3/0354* (2013.01)
*H01H 13/83* (2006.01)
*H01L 43/00* (2006.01)
*H01H 3/12* (2006.01)

(52) U.S. Cl.
CPC ......... *G06F 3/03543* (2013.01); *H01H 13/83* (2013.01); *H01L 43/00* (2013.01); *G06F 2200/1612* (2013.01); *H01H 3/125* (2013.01); *H01H 2219/056* (2013.01); *H01H 2219/06* (2013.01); *H01H 2219/066* (2013.01); *H01H 2235/028* (2013.01)

(56) References Cited

U.S. PATENT DOCUMENTS

| | | | |
|---|---|---|---|
| 5,735,390 A * | 4/1998 | Takagi et al. | 200/344 |
| 5,977,888 A * | 11/1999 | Fujita et al. | 341/34 |
| 6,118,092 A * | 9/2000 | Hayashi | 200/344 |
| 7,525,056 B2 * | 4/2009 | Chiba et al. | 200/314 |
| 8,232,494 B2 * | 7/2012 | Purcocks | 200/521 |
| 8,648,677 B2 * | 2/2014 | Su et al. | 335/205 |
| 2006/0238281 A1 | 10/2006 | Steinberg | |
| 2009/0153497 A1 | 6/2009 | Jung et al. | |
| 2010/0214228 A1 | 8/2010 | Sailer et al. | |
| 2010/0258420 A1 * | 10/2010 | Tsai et al. | 200/314 |
| 2012/0086643 A1 * | 4/2012 | Larsen et al. | 345/168 |
| 2014/0014486 A1 * | 1/2014 | Knighton et al. | 200/5 A |

FOREIGN PATENT DOCUMENTS

| | | |
|---|---|---|
| KR | 1019960008878 A | 6/1999 |
| KR | 10-2007-0110352 A | 11/2007 |
| KR | 1020080056342 A | 6/2008 |
| KR | 10-2009-0063637 A | 6/2009 |
| KR | 20-0448924 | 5/2010 |
| KR | 10-2010-0081985 A | 7/2010 |
| TW | I276128 A | 10/1994 |
| TW | 201001233 A | 6/1997 |
| WO | 2006/088499 A1 | 8/2006 |

OTHER PUBLICATIONS

"First Office Action dated Mar. 7, 2014," Taiwan Application No. 101100165, 7 pages.

"First Office Action dated Jul. 2, 2014," Chinese Application No. 201180069034.0, 11 pages.

Notide of Non-Final Rejection mailed Apr. 28, 2016 in corresponding Korean Patent Application No. 10-2013-7020717.

\* cited by examiner

OPTICALLY TRANSMISSIVE KEY ASSEMBLIES FOR DISPLAY-CAPABLE KEYBOARDS, KEYPADS, OR OTHER USER INPUT DEVICES

TECHNICAL FIELD

The present disclosure relates generally to keys, buttons, or actuators that include an optically transmissive portion and a resilient element, structure, or mechanism configured to provide a tactile feedback to a user upon user-effectuated or user-directed actuation or displacement of said keys, buttons, or actuators. The key, button, or actuator includes an electromechanical contact element disposed at a periphery of said key, button, or actuator, wherein the electromechanical contact element is displaceable for contacting an electromechanical switch to thereby actuate the electromechanical switch. The present disclosure further relates to various types of user input devices configured for providing optical signals to users by way of such keys.

BACKGROUND

Keyboards are conventionally used for facilitating, enabling, or mediating user input into computing devices (e.g., desktop computers and laptops). A conventional keyboard mechanism has the function or advantage of providing immediate, or substantially immediate, tactile feedback to a user upon user-actuation of key(s) on the keyboard. A conventional keyboard is typically composed of multiple rows of keys representing different alphanumeric characters. In addition, the conventional keyboard also has a row of keys associated with specific functions represented by the alphanumeric icon of F1 to F12. Further keys designating specific functions (e.g., insert function, page up and page down function, and delete function) are also commonly found on a conventional keyboard.

A keycap is typically a small plastic cover that is placed over a key switch carried by a computer keyboard. Keycaps are conventionally used to indicate or display the alphanumeric character that they correspond to or the function that is associated therewith. Generally, user-effectuated displacement or depression of a keycap results in an actuation of a corresponding key switch that is positioned underneath said keycap.

There are several modifications recently made to keyboards, keys, as well as keycaps. For instance, keyboards configured to allow light to shine through specific portions or areas of the keyboards, for instance at or along specific rows of keys of said keyboards, have been developed. The illumination of specific areas, or of specific keys, on the keyboard can help to distinguish different areas of the keyboard, as well as different keys on the keyboard, from each other. U.S. Pat. No. 4,449,024 discloses an illuminated keyboard that allows light to shine through specific keycaps. In addition, U.S. Pat. No. 9,755,062 discloses keyboards with keycaps that each has a different transparent alphanumeric designation. Each keycap of the keyboard of U.S. Pat. No. 9,755,062 is composed of an opaque housing and a transparent alphanumeric designation. Light is only transmissible through the transparent alphanumeric designation to thereby enable differentiation between the different keys carried by the keyboard.

A significant drawback or limitation associated with conventional keyboards is the static information, for instance static letters and numbers, that is displayed by individual keys of said keyboards. Unlike touchscreen interfaces, existing conventional keyboards do not provide a user with dynamically changing interface via which a user can introduce inputs, instructions, and/or commands.

Touchscreen interfaces are becoming increasingly popular. Computers and other electronic products that incorporate a touchscreen, for example the Apple iPhone™, provide users with a relatively more intuitive way of controlling (e.g., providing input to) said computers. In addition, touchscreen interfaces allow programmers to provide customized interfaces, which can be required and/or advantageous with particular applications. However, a common disadvantage associated with conventional touchscreen interfaces is a lack of a robust haptic or tactile feedback to users to confirm user-directed touchscreen inputs.

Haptic touchscreen interfaces (i.e., touchscreen interfaces that provides a tactile feedback to users upon touchscreen inputs) have generated increasing commercial interest. For example, LG© and Samsung© have introduced handsets and mobile phones that incorporate vibration-based haptic feedback systems. However, such vibration-based haptic feedback systems are relatively complex and costly to manufacture, assemble, and/or maintain. In addition, vibration-based haptic feedback systems may not be suitable for rapid and/or short-duration multiple consecutive user-inputs.

U.S. patent application Ser. No. 11/388,224 discloses a lid structure that can be positioned relative to, for instance on the surface of, a touchscreen interface for providing tactile feedback to a user. The lid structure can be shaped and configured to guide a user's finger(s) to a desired position on the touchscreen. However, there are ergonomic disadvantages or issues associated with the lid structure of U.S. Ser. No. 11/388,224. In addition, the lid structure of U.S. Ser. No. 11/388,224 is not robust enough for providing fast and/or accurate tactile feedback associated with specific individual user inputs via the touchscreen.

In addition, U.S. patent application Ser. No. 10/235,162 discloses a touchscreen tactile feedback system. With the touchscreen tactile feedback system of U.S. Ser. No. 10/235, 162 a keyboard including keys mechanically interfaces with a touchscreen panel. The keys of the keyboard can be physically displaced by a user for contacting the touchscreen panel and thereby enable user-directed input via said touchscreen panel. The physical displacement of the keys provides the user with a tactile response or feedback associated with the user-directed input.

However, existing touchscreens are generally unable to support, accommodate, or keep up with rapid user actuation or input, for example user-effectuated consecutive actuations of more than 100 actuations or inputs per minute). Therefore, the use of touchscreens may not be suitable for applications in which rapid user actuation or input is routinely necessary and/or desired, for instance for gaming applications.

SUMMARY

In accordance with a first aspect of the present disclosure, there is disclosed a device that includes a body comprising a light permeable region, the body configured to be resiliently displaceable between a first position and a second position relative to a surface, the second position located in closer proximity to the surface than the first position. The device also includes a switch actuator disposed external to an area of the light permeable region defined by the light permeable region's perimeter. The switch actuator is displaceable towards the surface in response to displacement of the body. The device further includes an optical film one of carried by and coupled to the light permeable region of the body, wherein an angle of light transmitted through the light permeable region is at least partially dependent upon a set of optical properties of the optical film.

In accordance with a second aspect of the present disclosure, there is disclosed a computer mouse that includes a display screen configured to output variable image content. The computer mouse includes a computer mouse housing that carries a set of optically transmissive displaceable structures disposed relative to the display screen. Each optically transmissive displaceable structure of the set of optically transmissive displaceable structures includes a body comprising a light permeable region and a switch actuator. The body is configured to be resiliently displaceable between a first position and a second position relative to the display screen, the second position located in closer proximity to the display screen. The switch actuator is disposed external to an area of the light permeable region defined by the light permeable region's perimeter. The switch actuator is displaceable towards the display screen in response to displacement of the body, wherein the area of the light permeable region is at least approximately 75% of an area of the body defined by the body's perimeter.

In accordance with a third aspect of the present disclosure, there is disclosed a device that includes a body configured to be resiliently displaceable between a first position and a second position relative to a surface, the second position located in closer proximity to the surface than the first position. The device also includes an offset pivot mechanism coupled to the body and configured to bias the body at the first position. The offset pivot mechanism defines a pivot axis about which the body is pivotable, the pivot axis located one of along a perimeter of the body and external to an area of the body defined the perimeter of the body. The body is pivoted about the pivot axis during displacement of the body between the first position and the second position. In addition, the device includes a switch actuator coupled to the body and positioned one of at the perimeter of the body and external to the area of the body, the switch actuator displaceable towards the surface in response to displacement of the body.

In accordance with a fourth aspect of the present disclosure, there is disclosed a device that includes a body configured to be resiliently displaceable between a first position and a second position relative to a surface, the second position located in closer proximity to the surface than the first position, the surface one of comprising and associated with a set of surface magnets. The device also includes a set of device magnets coupled to the body and configured to generate an electromagnetic field with the set of surface magnets. The electromagnetic field one of facilitates and effectuates biasing of the body at the first position, the set of device magnets positioned one of at a perimeter of the body and external to an area of the body defined the body's perimeter. The electromagnetic field generated between the set of surface magnets and the set of device magnets provides a resistance associated with displacement of the body from the first position towards the second position.

In accordance with a fifth aspect of the present disclosure, there is disclosed a method for manufacturing a device. The method includes forming a body configured to be resiliently displaceable between a first position and a second position relative to a surface, the second position located in closer proximity to the surface than the first position. The method also includes forming a light permeable region carried by the body and disposing a switch actuator external to an area of the light permeable region defined by the light permeable region's perimeter. The switch actuator is displaceable towards the surface in response to displacement of the body. In addition, the method includes providing an optical film that is one of carried by and coupled to the light permeable region of the body, wherein angle of light transmitted through the light permeable region of the body is at least partially dependent upon a set of optical properties of the optical film.

In accordance with a sixth aspect of the present disclosure, there is disclosed a method for assembling a computer mouse. The method includes providing a display screen configured to output variable image content and disposing a set of optically transmissive displaceable structures relative to the display screen. The set of optically transmissive displaceable structures is carried by a computer mouse housing. Each optically transmissive displaceable structure of the set of optically transmissive displaceable structures includes a body comprising a light permeable region and a switch actuator. The body is configured to be resiliently displaceable between a first position and a second position relative to the display screen, the second position located in closer proximity to the display screen. The switch actuator is disposed external to an area of the light permeable region defined by the light permeable region's perimeter. The switch actuator is displaceable towards the display screen in response to displacement of the body. The area of the light permeable region is at least approximately 75% of an area of the body defined by the body's perimeter.

In accordance with a seventh aspect of the present disclosure, there is disclosed a method for manufacturing a device. The method includes forming a body that is resiliently displaceable between a first position and a second position relative to a surface, the second position located in closer proximity to the surface than the first position. In addition, the method includes coupling an offset pivot mechanism to the body, the offset pivot mechanism configured to bias the body at the first position, the offset pivot mechanism defining a pivot axis about which the body is pivotable, the pivot axis located one of along a perimeter of the body and external to an area of the body defined the perimeter of the body, the body pivoted about the pivot axis during displacement of the body between the first position and the second position. The method further includes coupling a switch actuator to the body, the switch actuator positioned one of at the perimeter of the body and external to the area of the body, the switch actuator displaceable towards the surface in response to displacement of the body.

In accordance with an eighth aspect of the present disclosure, there is disclosed a method for manufacturing a device. The method includes forming a body that is resiliently displaceable between a first position and a second position relative to a surface. The second position located in closer proximity to the surface than the first position. The surface includes or is associated with a set of surface magnets. The method also includes coupling a set of device magnets coupled to the body and configured to generate an electromagnetic field with the set of surface magnets. The electromagnetic field facilitates or effectuates biasing of the body at the first position. The set of device magnets is positioned one of at a perimeter of the body and external to an area of the body defined the body's perimeter. The electromagnetic field generated between the set of surface magnets and the set of device magnets provides a resistance associated with displacement of the body from the first position towards the second position.

BRIEF DESCRIPTION OF THE DRAWINGS

Embodiments of the present disclosure are described hereinafter with reference to the figures, in which.

DETAILED DESCRIPTION

Figure 1A:
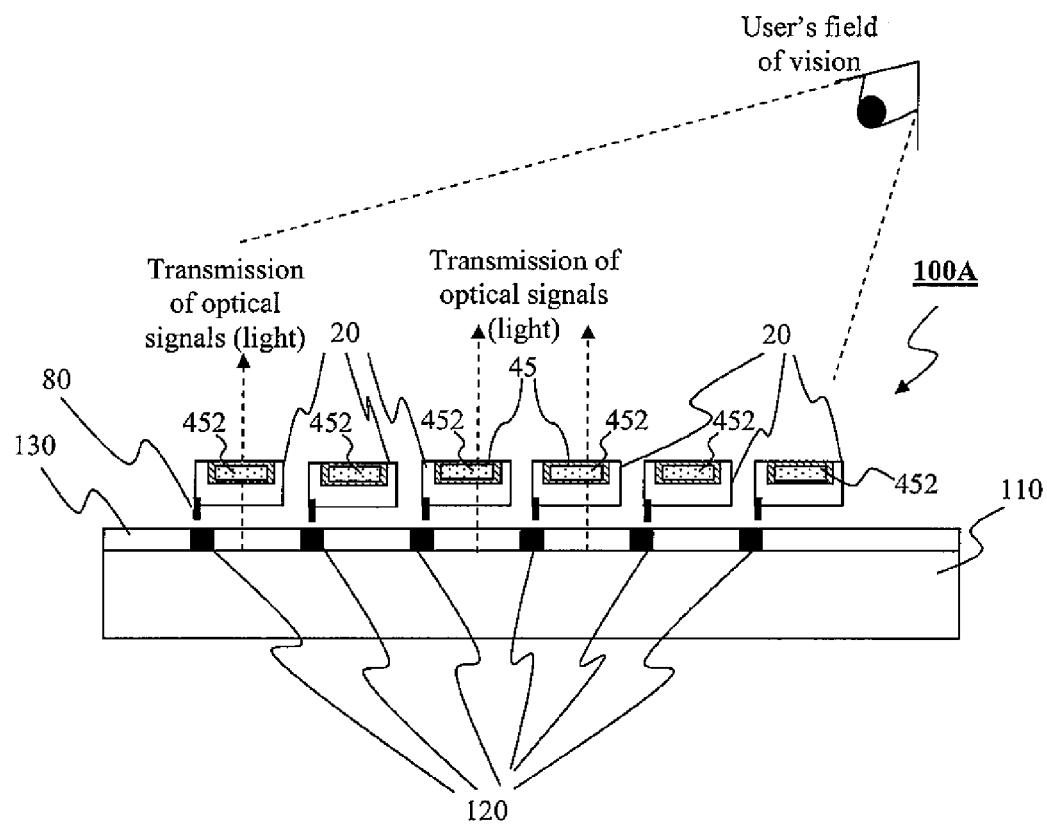
FIG. 1A is a schematic illustration of a display-capable keyboard apparatus that includes an optically transmissive tactile key assembly according to an embodiment of the present disclosure.

Embodiments of the present disclosure relate to keys, buttons, and actuators that include a body with an optically transmissive portion or region (also known as a light permeable or transmissive portion or region) and a resilient structure, element, support, or mechanism coupled to the body. The resilient structure, element, support, or mechanism is configured for providing a tactile feedback to a user upon user-effectuated, user-controlled, or user-directed actuation or displacement of said keys, buttons, and actuators. The keys, buttons, and actuators include a switch actuator, for example an electromechanical switch actuator or an electromechanical contact element, couplable to the body. The switch actuator is positioned or disposed at a periphery or perimeter of the body, for example along a side or edge of or at a corner of the body, or at a distance away from the body. The keys, buttons, and actuators can be coupled to, carried by, assembled or arranged onto, disposed relative to or across, or used with an optically transmissive surface or screen (or an optical display screen or surface). The optical display screen can be a rigid display screen, for example an LCD or LED based screen, or a flexible display screen, for example a polymer based screen configured as an organic LED (OLED) screen. The keys, buttons, and actuators can also be coupled to, carried by, assembled or arranged onto, disposed relative to or across, or used with a carrier surface or structure (or a support surface or structure) that carries, supports, interconnects, or is associated with, a plurality of switches (e.g., electromechanical switches). In some embodiments, the optical display screen can be coupled to, carried by, or even integrated or incorporated with, the carrier surface of the switches (e.g., electromechanical switches).

Each key, more specifically the switch actuator (e.g., electromechanical switch actuator) of each key, can correspond to one switch (e.g., electromechanical switch). Displacement of a particular key relative to said key's corresponding switch can trigger, effectuate, or cause an activation or actuation of said switch. An activation or actuation of said switch can result in generation of electrical signal(s) by said switch. In several embodiments, contact between an electromechanical switch actuator of a particular key with the key's corresponding electromechanical switch can effectuate generation of electrical signal(s) that are transmissible to an electronic or computing device (e.g., a desktop or laptop computer, a gaming console, or a mobile phone) coupled to the electromechanical switch.

In multiple embodiments, the key, more specifically the body of the key, includes or incorporates the optically transmissive (or light permeable) surface, portion, area, or window. The optically transmissive or light permeable surface, region, portion, area, or window can be referred to as a viewing area or a viewing window (e.g., an image viewing area or an image viewing window). Where the key is disposed or positioned adjacent or relative to, more specifically on top of or over a light-emitting surface (e.g., a display screen or surface such as a LCD screen), the light permeable portion or surface of the body allows transmission of light emitted from the light-emitting portion or surface, more specifically from the portion or area of the light-emitting surface corresponding to the light permeable portion or surface of the body, therethrough. The transmission of light through the light permeable portion or surface of the body allows a user to view or see images (e.g., icons, figures, and alphanumeric characters) displayed by the underlying surface (e.g., display screen or surface such as an LCD screen), more specifically by the area of the underlying surface corresponding to the light permeable portion or surface of the body.

The light permeable region or surface of the body can be configured and/or constructed for selecting and/or varying the light transmission properties associated with the light permeable region. For example, the light permeable region or surface can be configured and/or constructed to increase a quantity (or intensity) of light transmissible through said light permeable portion or surface. In some embodiments, the light permeable region or surface can be configured to magnify light or optical signals transmitted through the light permeable region. In addition, or alternatively, the light permeable region or surface can be configured and/or constructed depending upon an intended or target angle of light transmission through said light permeable region or surface.

In some embodiments, the light permeable region or surface of the body can include an optical film (e.g., a light turning film). The set of optical properties of the optical film (e.g., light tuning film) can determine the light transmission properties of the light permeable region or surface. For example, the optical film (e.g., the light turning film) can be chosen, selected, and/or configured depending upon target or intended angle of light transmission through the light permeable region or surface of the body.

The key, button, or actuator, more specifically the body of the key, button, or actuator is displaceable, for instance relative to the optical display screen or surface. More specifically, the key, and hence the key's switch actuator (e.g., electromechanical switch actuator) can be displaced relative to a corresponding switch (e.g., electromechanical switch). The key, and/or various elements or components thereof, can be displaced between a first position and a second position relative to the optical display screen or surface, wherein the second position is located in closer proximity to the optical display screen or surface as compared to the first position.

In many embodiments, the resilient structure is shaped and/or configured to bias the body at the first position (also referred to as a rest position, a rest state, or an original position). The body is actuable (e.g., displaceable or moveable) from the first position to or towards the second position (also referred to as an actuated position or an actuated state) by a force applied onto, or transferred to, the body. The displacement of the body, for example from the first position to the second position, facilitates or effectuates a corresponding displacement of the switch actuator (e.g., electromechanical contact element). In many embodiments, the displacement of the body of a key at the second position correspondingly displaces the switch actuator of said key for facilitating or effectuating actuation of a corresponding switch. For instance, the displacement of the body of a particular key at the second position can effectuate contact between the switch actuator (e.g., electromechanical switch actuator or contact element) of said key and said key's corresponding switch (e.g., electromechanical switch). Such a contact can facilitate or effectuate activation or actuation of said switch (e.g., electromechanical switch) and thereby effectuate generation of electrical signal(s) by said switch (e.g., electromechanical switch).

The resilient structure is configured to provide or impart a resistive force or resistance, for example at least a measure of resistance, to user-controlled or user-effected displacement of the body from the first position to the second position. In multiple embodiments, the resilient structure is configured, positioned, and/or constructed for providing tactile feedback to a user upon, or during, the user-controlled or user-effected displacement of the body from the first position towards the second position. In multiple embodiments, the resilient structure, or at least a portion thereof, is positioned at a perimeter of the body or external to an area of the body defined by the body's perimeter.

The tactile feedback provided to the user of the key, button, or actuator upon or during actuation or displacement of said key, button, or actuator (e.g., displacement from the first position to the second position) can be desirable, advantageous, important, and/or useful, particularly when applied to particular functions (e.g., gaming applications) wherein fast, discernible, easy, and/or accurate feedback, knowledge, and/or confirmation of key actuation is required and/or desired. The immediate, or substantially immediate, feedback, i.e., in the form of tactile sensation or feedback, provided by the keys, buttons, and actuators of embodiments of the present disclosure can be significantly useful and advantageous to a user's overall gaming experience. The keys, buttons, and actuators of various embodiments supports rapid consecutive actuations or displacements (e.g., at least 50, 100, 150, or more actuations or displacements per minute) thereof for contacting corresponding switches (e.g., electromechanical switches) and generating electrical signals transmissible to the computing device. This means that the keys, buttons, and actuators can be associated with a low, or very low, switch actuation latency period or duration, for example a switch actuation latency period or duration of less than approximately 2 ms, 1 ms, 0.5 ms, or less.

In addition, multiple embodiments of the present disclosure provide an ability to configure and/or position the resilient structure and/or the switch actuator relative to the body in a manner such that the area of the viewing window is maximized. This is to say, the resilient structure and/or the switch actuator can be configured and/or positioned to minimize obstruction or blockage of light transmitted through the light permeable region or surface. Furthermore, the light permeable region of the body can be configured and/or constructed to provide or achieve an intended or target set of light transmission properties, for example brightness or intensity of light and/or light transmission angle, associated with said light permeable region. In multiple embodiments, the light turning film that is coupled to or carried by the light permeable region provides a range of viewing angles and/or an effective viewing area that is significantly and/or surprising different, increased, and/or better as compared to viewing angles and/or effective viewing areas associated with existing optical devices.

Various embodiments of the present disclosure provide a user input device that is configurable to provide visual information to a user by way of one or more optically transmissive tactile keys, buttons, or actuators (or optically transmissive tactile key, button, or actuator assemblies). Particular embodiments of the present disclosure can thus be categorized or defined as tactile input/visual output devices, apparatuses, or assemblies. In accordance with various embodiments of the present disclosure, visual output provided by way of one or more optically transmissive tactile keys, buttons, or actuators (or optically transmissive tactile key, button, or actuator assemblies) can correspond to or include user interpretable or user activatable information content, and/or aesthetic or decorative content.

Representative aspects of keys, buttons, and actuators (or key, button, and actuator assemblies) that are configured to provide tactile feedback upon user-effectuated actuation or displacement of said key, button, and actuators, as well as systems, methods, and/or processes incorporating, including, and/or using said keys, buttons, and actuators, are described in detail hereinafter with reference to FIG. 1 to FIG. 7, in which like or analogous elements or process portions are shown numbered with like or analogous reference numerals. Relative to descriptive material corresponding to one or more of FIGS. 1 to 7, the recitation of a given reference numeral can indicate simultaneous consideration of a FIG. in which such reference numeral was previously shown. The embodiments provided by the present disclosure are not precluded from applications in which particular fundamental structural and/or operational principles present among the various embodiments described herein are desired.

Aspects of Key, Button, or Actuator Embodiments

FIG. 1A to FIG. 4C show keys 20 and key assemblies 100, or particular aspects or portions of said keys 20 and key assemblies 100, according to various embodiments of the present disclosure. The keys 20 and key assemblies 100 are optically transmissive tactile keys 20 and key assemblies 100.

The key 20 can be coupled to, disposed on, carried by, placed onto, or positioned or disposed relative to, a display surface or screen 110 (e.g., an optical display surface or screen). The display surface or screen 110 includes one of a rigid display surface, for example an LCD or LED based display surface, and a flexible display surface, for example a polymer based display surface that is configured as an organic LED (OLED) surface. In many embodiments, the display surface or screen 110 is referred to as an optical display surface or screen. The display surface or screen 110 (e.g., LCD screen) is configured to dynamically display images (e.g., icons, figures, and alphanumeric characters). The display surface or screen 110, or specific portions, areas, or regions of the display surface or screen 110, can be configured to variably display images at specific, predetermined, or different time intervals. In several embodiments, the display surface or screen 110 is coupled to a computing system that is configured to execute stored program instructions corresponding to one or more application programs. Accordingly, the display surface or screen 110 can be configured to variably display images depending upon one or more application programs. In several embodiments, the visual information (e.g., images, icons, text, and optical signals) displayed at different portions, regions, or areas of the display surface 110 can be dependent upon executed application program(s).

In many embodiments, the key 20 is optically transmissive. The key 20 can include an optically transmissive or light permeable surface, region, portion, or area 45 that is configured to allow light transmission therethrough. The light permeable portion or surface 45 of the key 20 can have a perimeter that defines an area of the light permeable portion or surface 45. Portions or areas of the display screen 110 can be viewed or seen through corresponding light permeable portions 45 of the keys 20. For instance, in embodiments wherein there are multiple keys 20 coupled to, carried by, or disposed relative to the display screen 110, multiple portions or areas of the display screen 110 can be viewed or seen through corresponding multiple light permeable regions 45 of such keys 20.

FIG. 1A shows a schematic illustration of a display-capable keyboard apparatus 100A (or display capable keyboard based key assembly 100A) that includes a plurality of optically transmissible tactile keys 20 in accordance with particular embodiments of the present disclosure. The optically transmissible tactile keys 20 are coupled to, carried by, or disposed relative to the display screen 110 that is carried by, or incorporated into, the display-capable keyboard apparatus 100A.

Figure 1B:
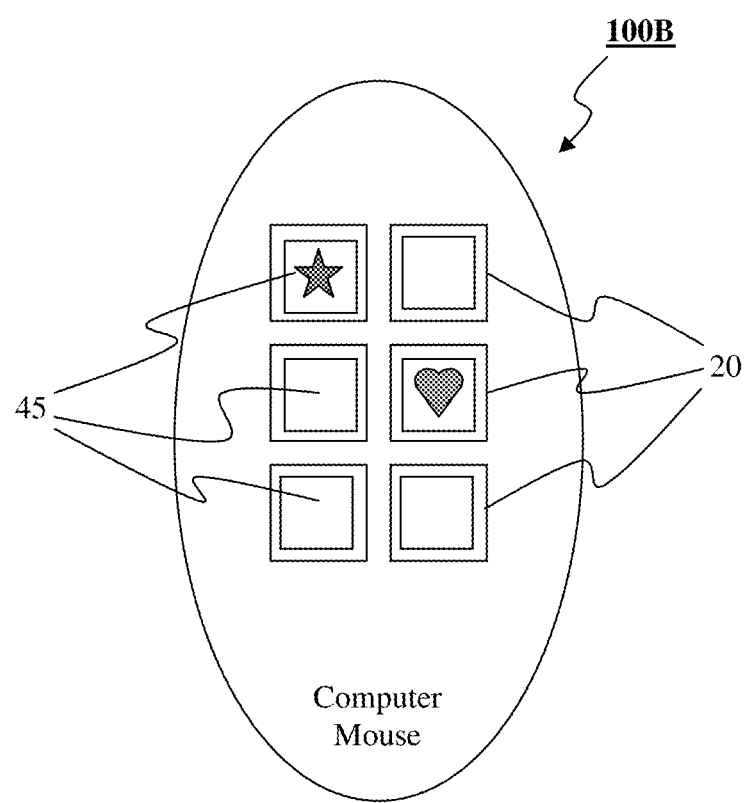
FIG. 1B is an external view of a computer mouse version of the apparatus of FIG. 1A according to particular embodiments of the present disclosure.
Figure 1C:
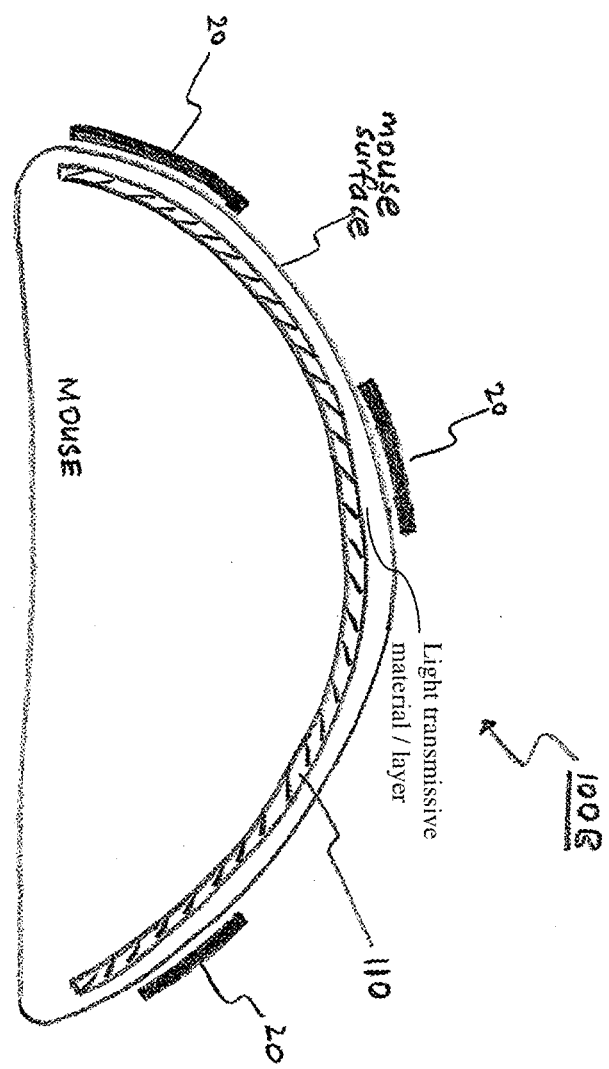
FIG. 1C is a cross-sectional view of the computer mouse version of FIG. 1B according to particular embodiments of the present disclosure.

FIG. 1B and FIG. 1C show aspects of a display capable computer mouse key assembly or apparatus 100B. The display capable computer mouse key assembly 100B includes a plurality of optically transmissive tactile keys 20. In addition, the computer mouse key assembly 100B includes the display screen 110, for example a flexible, or at least substantially flexible OLED display screen 110. The flexible OLED display screen 110 of the computer mouse can be shaped and configured to conform to, follow, or at least somewhat follow, the contour or curvature of a mouse surface. The plurality of optically transmissive tactile keys 20 are coupled to, carried by, or disposed relative to or adjacent the flexible OLED display screen 110.

Further details and description in relation to key assemblies and systems 100, for example the display-capable keyboard assembly 100A and the display-capable computer mouse key assembly 100B, are provided below.

The keys 20 in accordance with embodiments of the present disclosure include a body 40, a resilient structure 60, and a switch actuator 80 that is couplable to the body 40. In many embodiments, the switch actuator 80 is an electromechanical switch actuator 80 or an electromechanical contact element 80. In several embodiments, the switch actuator 80 is a micro switch actuator 80.

In most embodiments, the body 40 includes the optically transmissive or light permeable surface, region, portion, or area 45 that is configured to allow light transmission therethrough. The optically transmissive or light permeable region 45 of the body 40 can be referred to as an image viewing area or window 45.

In several embodiments, the light permeable portion 45 of the body 40 has an area of at least 50% of the body's area as defined by a perimeter of the body 40. In various embodiments, the light permeable portion 45 has an area of at least 75%, 85%, or even 95% of the body's area. In specific embodiments, the entire body 40, or at least a substantial portion of the body 40, is optically transmissive or light permeable. For instance, in certain embodiments, the entire body 40, or at least a substantial portion of the body 40, is made or constructed of an optically transmissive material. Accordingly, the keys 20 of the multiple embodiments of the present disclosure can be referred to as optically transmissive keys 20.

Various Aspects of the Body 40

In many embodiments, the body 40 is coupled to the resilient structure 60. The body 40 can be displaced relative to the display screen 110, for example between at least a first position and a second position relative to the display screen 110. The second position can be located in closer proximity to the display screen 110. Accordingly, the body 40 is displaceable to various distances relative to the display screen 110.

A force (e.g., a user-controlled or user-effectuated force) applied to or onto the body 40 can facilitate or effectuate displacement of the body 40, for instance to or towards the display screen 110 (e.g., from the first position to or towards the second position relative to the display screen 110).

As mentioned above, the body 40 includes the optically transmissive or light permeable surface, region, portion, area, or window 45 (also referred to as a viewing window or viewing area). In several embodiments, the light permeable region 45 (or the image viewing area or window) is a planar, or substantially planar, surface. The light permeable region or surface 45 of the body 40 can be shaped and/or configured to follow, or at least somewhat follow or conform to, the surface contour of the display screen 110. In several embodiments, the light permeable region or surface 45 can be configured and/or positioned such that it can be disposed or positioned parallel, or substantially parallel, to the display screen 110.

The ability for light transmission through the light permeable region 45 allows images displayed on the display screen 110 to be seen or viewed by a user. More specifically, an area or portion of the display screen 110 that corresponds to (e.g., is located or disposed directly underneath) said light permeable portion, area, or surface 45 of the key 20 can be viewed by the user. The display screen 110 is configured to output variable images (or optical signals), for instance depending upon application program(s) executed by a computing system coupled to the display screen. Such variable images (or optical signals) output by the display screen 110 can be transmitted through the light permeable region, portion, area, or surface 45 of the body 40 of the key 20.

The light permeable region or surface 45 of the body 40 can be shaped, dimensioned, and/or configured to increase or maximize an area that allows light transmission through the body 40. Increasing the area of the light transmissible region 45 can result in, or provide, a larger area of the body 40 through which a user is able to view images displayed by the display screen 110.

In several embodiments, the area of the light permeable region, portion, area, or surface 45 is at least 50% of body's area. More specifically, the area of the light permeable region 45 as defined by the light permeable region's perimeter is at least 50% of the area of the body 40 as defined by the body's perimeter. In some embodiments, the area of the light permeable region 45 is at least approximately 75% of the area of the body. In various embodiments, the area of the light permeable region 45 is at least approximately 85%, and in particular embodiments at least approximately 95%, of the area of the body.

In several embodiments, the light permeable region 45 is configured and/or constructed to select, determined, and/or vary a set of light transmission properties associated with the light permeable region 45. The set of light transmission properties can include, but is not limited to, an intensity or brightness of light transmitted through the light permeable region 45, a magnification or magnitude of optical signals transmitted through the light permeable region 45, and an angle of light transmitted through the light permeable region 45.

In many embodiments of the present disclosure, the light permeable region 45 can include an optical film 452 selected, configured, and/or constructed for providing the light permeable region 45 with an intended or target set of light transmission properties. In other words, the set of optical properties of the optical film 452 can determine the light transmission properties of the light permeable region 45. Further details and description in relation to the optical film 452 is provided below.

Various Aspects of the Resilient Structure 60

The resilient structure 60 (also referred to as a resilient or biasing mechanism) is coupled to the body 40 of the key 20. In many embodiments, the resilient structure 60 is configured to bias the body 40 at the first position (or at a predetermined distance away from the display screen 110).

The body 40 is displaceable relative to the display screen 110, for example between a number of positions (e.g., the first and second positions) relative to the display screen 110 (or between a number of different distances relative to the display screen 110). In multiple embodiments, the resilient structure 60 is configured to provide a resistive or opposing force (e.g., at least a measure of a resistive or opposing force) associated with the displacement of the body 40 towards the display screen 110. More specifically, the resilient structure 60 can be configured to provide a resistive force or resistance associated with displacement of the body 40 from the first position to or towards the second position. In several embodiments, the resilient structure 60 is configured to provide a snap curve-type resistance to displacement of the body 40.

As mentioned above, displacement of the body 40 (e.g., from the first position to, or towards, the second position) can be controlled or effectuated by a user. The resistive force provided by the resilient structure 60 in association with, upon, or during user-controlled or user-effectuated displacement of the body 40 from the first position to, or towards, the second position provides the user with a tactile feedback that is associated with body displacement. This tactile feedback associated with body displacement or movement gives or provides the user with a measure of confirmation or knowledge of user's input, more specifically user-effectuated actuation or displacement of the body 40.

In many embodiments of the present disclosure, the resilient structure 60, or at least a substantial portion thereof, is configured and/or positioned to minimize or reduce obstruction or blockage of light transmission through the light permeable region 45 of the body 40. For instance, in several embodiments, the resilient structure 60, or at least a substantial portion thereof, is positioned at a periphery of the body 40. In addition, or alternatively, the resilient structure 60, or a portion thereof, can be constructed or made with a material that allows light transmission therethrough (e.g., a transparent or semi-transparent material).

Various configurations, arrangements, or designs of, or associated with, the resilient structure 60 are described below.

Various Aspects of the Switch Actuator

The key 20 of embodiments of the present disclosure includes, incorporates, carries, or is couplable to the switch actuator 80, for example the electromechanical switch actuator 80 or electromechanical contact element 80. For purposes of clarity, the switch actuator 80 will be described in portions of the following description as the electromechanical switch actuator or electromechanical contact element 80. Contact between the electromechanical switch actuator 80 and a switch 120 (or electromechanical switch 120) can actuate the electromechanical switch 120 and trigger generation of electrical signal(s).

In many embodiments, the switch actuator 80 (e.g., the electromechanical switch actuator 80) of each key 20 is positioned or disposed at a periphery or perimeter of the body 40, for example at an edge or corner of the body 40, or external to the body's area as defined by the body's perimeter. The electromechanical switch actuator 80 can be of a small, or significantly small, dimension. In several embodiments, the electromechanical switch actuator 80 is a micro electromechanical switch actuator 80 of micro-range dimensions.

In several embodiments, the electromechanical switch actuator 80 can be carried by or coupled to the resilient structure 60. The electromechanical switch actuator 80 of a particular key 20 is displaceable in correspondence with displacement of the body 40 of said key 20. In various embodiments, the displacement of the body 40 of a particular key 20 facilitates or effectuates a corresponding displacement of the electromechanical switch actuator 80 for contacting at least one electromechanical switch 120.

In multiple embodiments, the electromechanical switch actuator 80 is shaped, dimensioned, and/or configured for minimizing obstruction or blockage of light transmission through the light permeable region 45 of the body 40. The position of the electromechanical switch actuator 80 at a periphery of, or even away from or external to, the body 40 of the key 20 can help minimize, reduce, or prevent obstruction or blockage of light transmission through the light permeable region 45 of the body 40 by the electromechanical switch actuator 80.

Many embodiments of the present disclosure provide keys 20, actuators, or buttons, that include, incorporate, or are couplable to the electromechanical switch actuator 80. The key 20 includes the body 40 which is displaceable for correspondingly displacing the electromechanical switch actuator 80 to thereby effectuate contact between the electromechanical switch actuator 80 and at least one electromechanical switch 120. The key 20 also includes the resilient structure 60 configured to provide a tactile feedback to a user associated with, or during, user-effectuated displacement of the body 40 and corresponding displacement of the electromechanical switch actuator 80. Tactile feedback upon, or associated with contact between the electromechanical contact element and the electromechanical switch is provided by the keys 20 of embodiments of the present disclosure. The electromechanical switch and/or the resilient structure 60 are positioned at a periphery of the body 40, or even away from or exterior to the body 40.

Keys 20 of various embodiments of present disclosure support, allow, or enable rapid actuation and displacement thereof, for example more than approximately 60, 80, 100, or more actuations per minute. The electromechanical switch actuator 80 can be displaced for actuating corresponding electromechanical switch(es) 120 at a rapid speed or rate, for example, more than approximately 60, 80, 100, or more actuations per minute. The electromechanical switch actuation speed or rate that is supported or enabled by keys 20 of various embodiments of the present disclosure is significant and/or surprising, more specifically significantly and/or surprising faster than switch actuation speeds or rates associated with related existing devices.

In several embodiments, the key 20, and the electromechanical switch actuator 80 of said key 20, has a short, or substantially short, electromechanical switch actuation latency period or duration. For instance, the key 20, and the electromechanical switch actuator 80, can be associated with an electromechanical switch actuation latency period or duration of less than approximately 1 second, 5 milliseconds, 1 millisecond, or even 0.5 milliseconds. Accordingly, the key 20 can support, allow, or enable rapid actuations of the electromechanical switch 120, for instance rapid consecutive contacts made between the electromechanical switch actuator 80 and the electromechanical switch 120 for facilitating or effectuating corresponding generation of electrical signals by the electromechanical switch 120. The electrical signal(s) generated by electromechanical switches 120 can be transmitted to a computing device for effectuating user-directed or user-controlled inputs or instructions into said computing device. In various embodiments, the use of electromechanical-type switch actuators 80 increases the robustness and/or simplicity of design of the keys 20 and/or enhances the cost-effectiveness associated with manufacture of the keys 20.

Figure 5A:
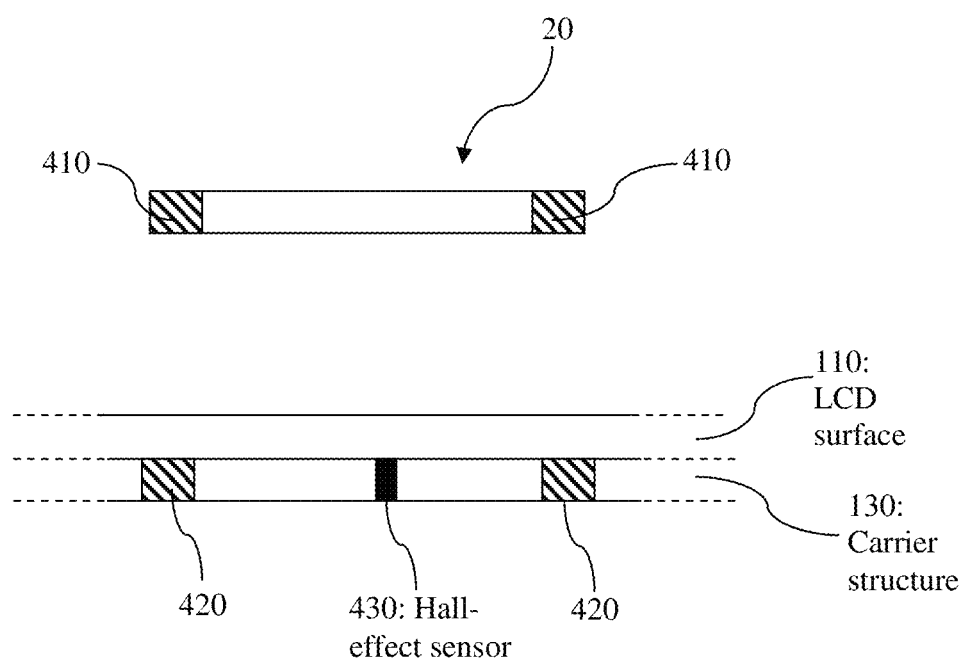
FIG. 5A shows a magnetic-repulsion type mechanism in accordance with an embodiment of the present disclosure.
Figure 5B:
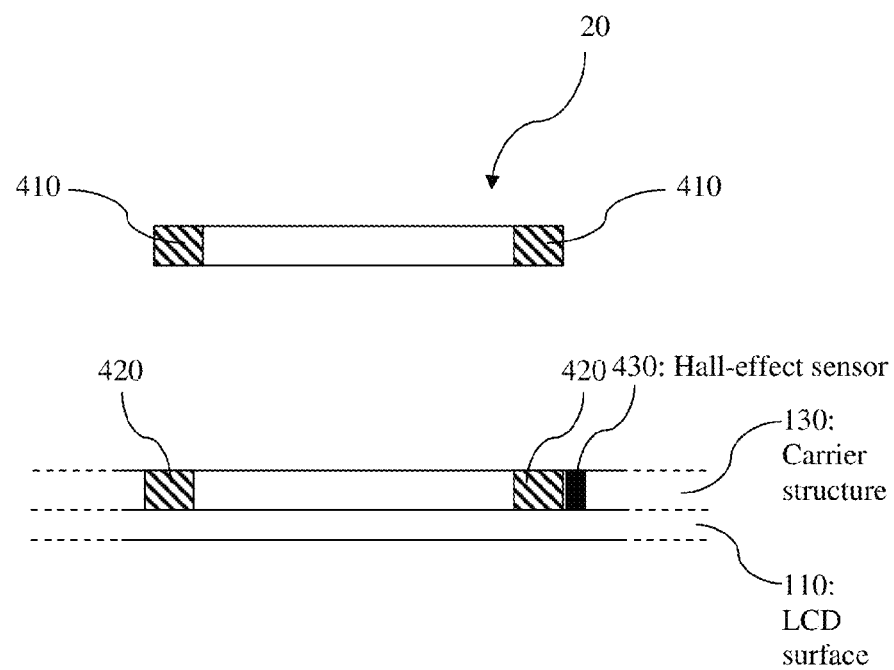
FIG. 5B shows a magnetic-repulsion type mechanism of alternative design or configuration to the magnetic-repulsion mechanism of FIG. 5A in accordance with an embodiment of the present disclosure.

Although electromechanical switches 120 are described above in the context of various embodiments of the present disclosure, other forms, types, or models of switches, which are useable in place of the electromechanical switches, are included within the scope of the present disclosure. For example, the displacement of the key 20, more specifically the body 40 of the key 20, can facilitate or effectuate actuation or activation of a hall-effect sensor 430 (as shown in FIG. 5A and FIG. 5B). Said actuation or activation of the hall-effect sensor 430 can result in the generation of electrical signals, which can be transmitted to a computing device for effectuating user-directed or user-controlled inputs or instructions into said computing device. More details and description in relation to displacement of keys 20 for activating or actuating hall-effect sensors 430 are provided below.

Examples of Resilient Structures

As described above, keys 20, buttons, and actuators of various embodiments of the present disclosure include the resilient structure 60. The resilient structure 60 is configured to provide a tactile feedback to a user upon user-controlled or user-effectuated displacement or actuation of the key 20, more specifically of the body 40 of said key 20. The resilient structure 60 can be configured and/or positioned to bias the body 40 at the first position and to provide a resistance or resistive force associated with a displacement of the body 40 from the first position to, or towards, the second position. The second position can be located at closer proximity to the display screen 110. Accordingly, the resilient structure 60 can be configured to provide a resistance or resistive force associated with displacement of the body 40 towards the display screen 110.

Various Aspects of an Offset Pivot or Remote Pivot Key Mechanism

Figure 2A:
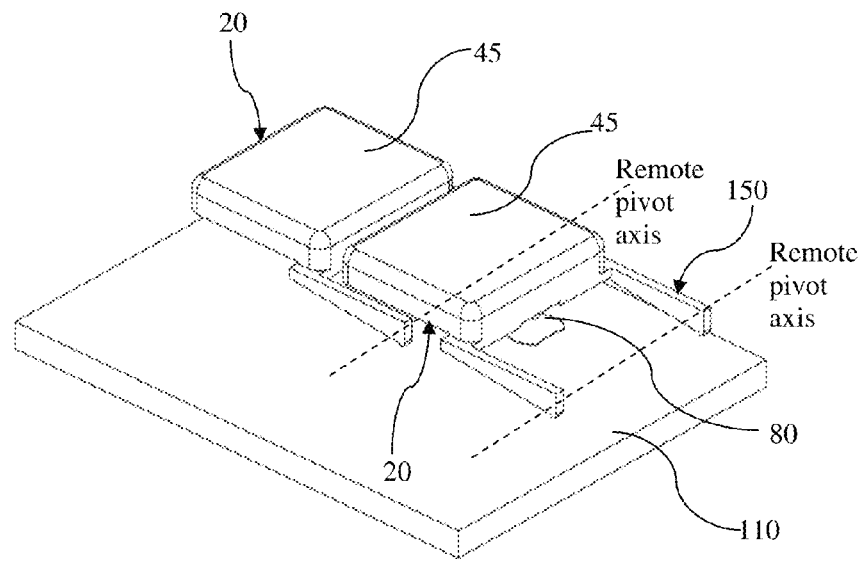
FIG. 2A shows an isometric view of two keys disposed relative to a display screen, each key including an offset pivot key mechanism according to particular embodiments of the present disclosure.
Figure 2B:
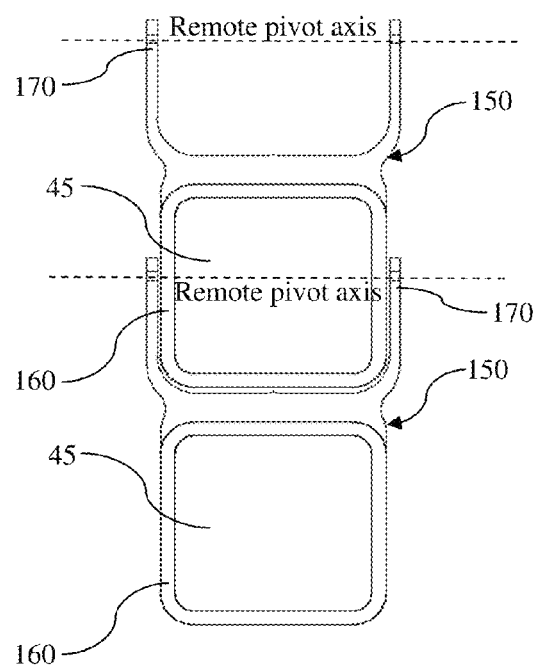
FIG. 2B shows a top cross-sectional view of two keys that include the offset pivot key mechanism of FIG. 2A.

FIG. 2A and FIG. 2B show an offset or remote pivot key mechanism 150 (also referred to as an offset or remote pivot mechanism or structure 150), or various aspects thereof, according to particular embodiments of the present disclosure.

The offset or remote pivot key mechanism 150 can include, or be constructed or made of, a sheet-metal frame. Alternatively, the offset or remote pivot key mechanism 150 can be constructed or made of other resilient materials, for instance a resilient plastic polymer.

As shown in FIG. 2A and FIG. 2B, the offset or remote pivot key mechanism 150 can include a support portion or structure 160. The support portion 160 can be shaped, dimensioned, and/or configured to carry or support the body 40 of a particular key 20. The support portion 160 can be shaped, dimensioned, and/or configured to couple to the body 40 of said key 20 at or along a periphery of the body 40, for example at or along at least one side or edge of the body 40. In particular embodiments, for example in embodiments shown in FIG. 2A and FIG. 2B, the support portion 160 can be shaped, dimensioned, and/or configured to couple to a number of peripheral edges of the body 40 such that the light permeable region 45 of the body 40 is located within, or substantially within, an area or perimeter defined by the support portion 160.

The offset or remote pivot key mechanism 150 can be configured and/or positioned in a manner that minimizes or reduces obstruction or blockage of light transmission through the light permeable region 45 of the body 40.

In many embodiments, the offset or remote pivot key mechanism 150 also includes a pivot or pivoting portion, region, or section 170. The pivot portion or section 170 is disposed at a distance away from the support portion 160. A remote pivot axis is defined at, or through, the pivot portion or section 170 of the offset pivot key mechanism 150. In many embodiments, the pivot portion or section 170, and hence the remote pivot axis, is located either at (or along) the perimeter of the body 40 or external to the area of the body 40 as defined by the perimeter of the body 40. Accordingly, the pivot portion 170, and hence the remote pivot axis, can be located away from, or external to, the area of the light permeable region 45. The location of the pivot portion 170 away from, or external to, the area of the light permeable region 45 can help to minimize or reduce obstruction caused by the pivoting portion to light transmission through the light permeable region 45.

In several embodiments, the offset or remote pivot key mechanism 150 includes, carries, or is couplable to, the electromechanical switch actuator 80. The electromechanical switch actuator 80 can include, or be, a snap dome. In particular embodiments, the snap dome can be coupled to or carried by the resilient structure 60, more specifically the offset pivot key mechanism 150 of the resilient structure 60. The electromechanical switch actuator 80 (e.g., snap dome)

can be positioned at the perimeter of the body 40 (e.g., at a side edge of the body 40) or away from, or external to, the body's area.

User-effectuated displacement of the body 40 (e.g., by a user applied force onto the body 40) can facilitate or effectuate a corresponding displacement of the offset or remote pivot key mechanism 150, more specifically a pivot or rotation of at least a portion of the offset or remote pivot key mechanism 150 about the remote pivot axis. The body 40 can be pivoted or rotated about the remote pivot axis upon user-effectuated displacement of the body 40. The displacement, more specifically pivot or rotation, of the body 40 about the remote pivot axis can effectuate displacement of the body 40 from the first position to or towards the second position. Displacement, more specifically pivot or rotation, of the body 40 from the first position to the second position can trigger or result in an actuation or activation of a switch 120 (e.g., electromechanical switch 120) that is coupled to, carried by, or disposed relative or adjacent to, the display screen or surface 110.

In many embodiments, the displacement, more specifically pivot or rotation, of the body 40 displaces the electromechanical switch actuator 80 and effectuates contact between the electromechanical switch actuator 80 and the switch 120, more specifically an electromechanical switch 120 or electromechanical micro-switch 120. The electromechanical switch 120 is coupled to, carried by, or disposed relative or adjacent to, the display screen or surface 110. The contact between the electromechanical switch actuator 80 and the electromechanical switch 120 causes or triggers actuation of the electromechanical switch 120 and thereby causes a generation of electrical signal(s) and transmission of generated electrical signal(s) to a computing device that is coupled to the electromechanical switch 120.

Various Aspects of Spring Mechanisms

Figure 3A:
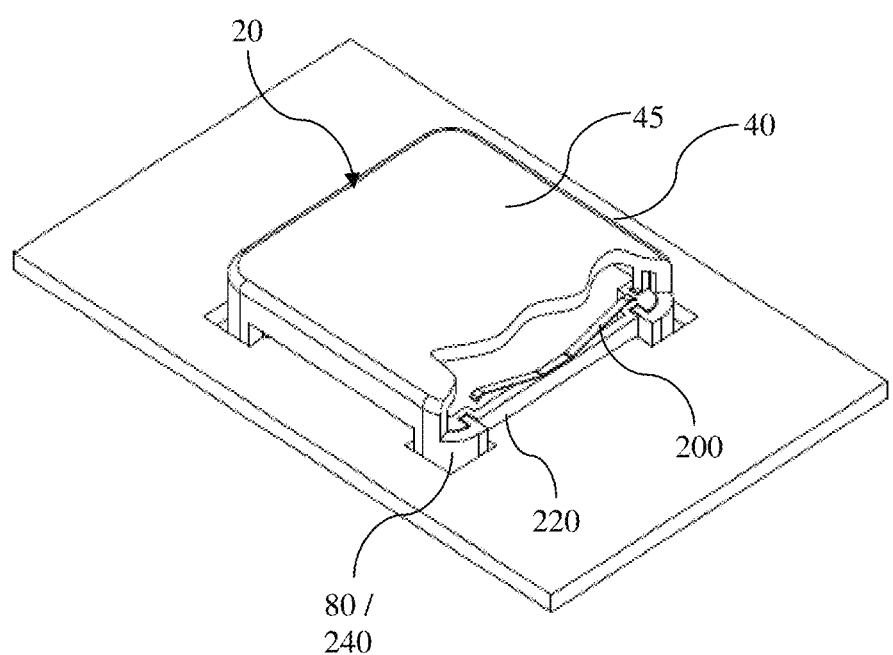
FIG. 3A shows a key including a set of balancing springs according to particular embodiments of the present disclosure.
Figure 3B:
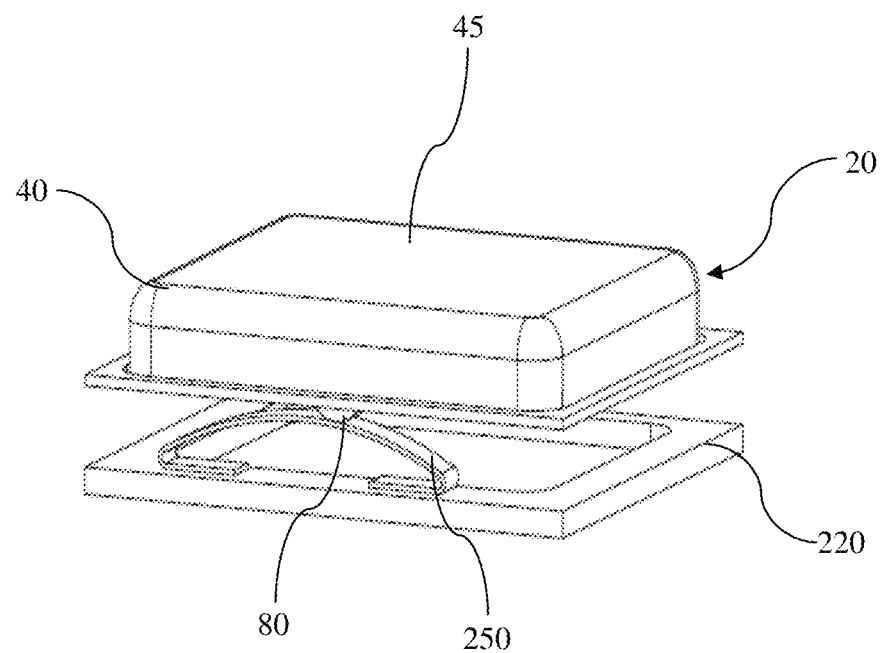
FIG. 3B shows a key including a set of buckling springs according to particular embodiments of the present disclosure.
Figure 3C:
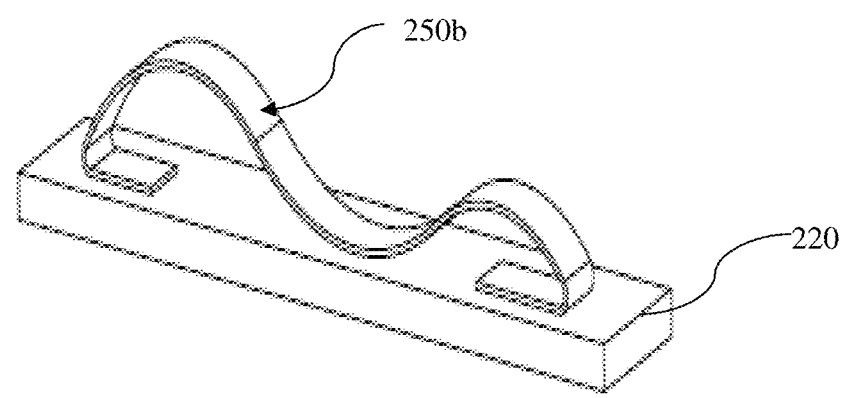
FIG. 3C shows a buckling spring configuration or design in accordance with an embodiment of the present disclosure.

FIG. 3A to FIG. 3C show particular resilient structures 60 that are, or include, incorporate, or carry, different spring mechanisms in accordance with particular embodiments of the present disclosure.

FIG. 3A shows a key 20 with a resilient structure 60 that is, includes, or incorporates a set of balancing springs 200 according to an embodiment of the present disclosure.

As shown in FIG. 3A, the key 20 includes a body 40, which can include a keycap and a keycap frame. The keycap frame can be disposed at the periphery or perimeter (e.g., at or along side edge(s)) of the keycap. The keycap can include, or be, the light permeable region 45. The resilient structure 60, or the set of balancing springs 200, is coupled to the periphery or perimeter (e.g., along the side edge(s)) of the body 40. As shown in FIG. 3A, the resilient structure 60 is coupled to the body 40 at or along the keycap frame.

The set of balancing springs 200 can include four balancing springs 200. Each balancing spring 200 can be disposed at, or along, one of four sides of the body 40 (or keycap). Alternatively, the set of balancing springs 200 can include two balancing springs 200, each balancing spring 200 located at opposing sides of the body 40. In specific embodiments wherein the body 40 has a triangular shape, the set of balancing springs 200 can include three balancing springs 200 each disposed at or along one of three sides of the triangular body 40. As shown in FIG. 3A, each balancing spring 200 is disposed at, or along, a keycap frame. Each balancing spring 200 can be coupled to, mounted onto, or carried by, the display screen or surface 110 (e.g., optical display screen). In several embodiments, each balancing spring 200 is coupled to, mounted onto, or carried by, the display screen 110 via a mounting frame 220 or a support frame 220.

The support frame 220 can interpose the key 20 and the display screen 110. In some embodiments, the support frame 220 is shaped and/or configured to carry multiple keys 20, and to interconnect said multiple keys 20. The support frame 220 can be coupled or attached to, or mounted onto, the display screen 110. The attachment or mounting of a support frame 220 that carries multiple keys 20 to the display screen 110 thereby effectuates placement of said multiple keys 20 relative to the display screen 110.

The set of balancing springs 200 is shaped and/or configured for biasing the body 40 of the key 20 (or keycap) at the first position. In addition, the set of balancing springs 200 can be shaped and/or configured to provide a resistance or resistive force associated with displacement of the body 40 (or keycap) from the first position to, or towards, the display screen 110 (i.e., to, or towards, the second position). Accordingly, in various embodiments, the set of balancing springs 200 is configured and/or positioned to provide a tactile feedback to a user associated with, or upon, user-effectuated displacement of the body 40 (or keycap).

In certain embodiments, for example in the embodiment as shown in FIG. 3A, the electromechanical switch actuator 80 (which can be known as an electromechanical plunger 240) is positioned or located at a corner of the body 40. Displacement of the body 40 (or keycap) from the first position to, or towards, the second position corresponding displaces the electromechanical switch actuator 80 (or the electromechanical plunger 240) for contacting the electromechanical switch 120 (or micro-switch) carried by the display screen 110.

The position of the electromechanical switch actuator 80 (or the electromechanical plunger 240) at a corner of the body 40 helps to minimize or reduce obstruction or blockage to light transmission through the light permeable region 45 of the body 40. Contact between the electromechanical switch actuator 80 (or the electromechanical plunger 240) and the electromechanical switch 120 generates electrical signals, which can be transmitted to a computing device coupled to the electromechanical switch 120.

FIG. 3B shows a key 20 that includes, is mounted onto, or is coupled to a resilient structure 60 that is, or includes, a set of buckling springs 250 according to an embodiment of the present disclosure.

The key 20 as shown in FIG. 3B includes a body 40 with a light permeable portion, area, or surface 45. The resilient structure 60 of the key 20 includes, or is, the set of buckling springs 250. In various embodiments, the set of buckling springs 250 is coupled to, carried by, mounted onto, or disposed relative to the display screen 110. In a similar manner to embodiments wherein the resilient structure 60 is a set of balancing springs, the set of bucking springs 250 can also be coupled to or carried by the support frame or structure 220 before being disposed relative to the display screen 110.

In particular embodiments, the set of buckling springs 250 includes two buckling springs 250, each buckling spring 250 positioned or disposed at or along an edge or side of the body 40. More specifically, each buckling spring 250 of the set of two bucking springs 250 is positioned at an opposite edge or side of the body 40. The set of buckling springs 250 can be configured, shaped, and/or positioned to minimize or reduce obstruction to light transmission through the light permeable portion or surface 45 of the body 40.

The set of bucking springs 250 is configured to provide a user with a tactile feedback upon, or associated with, user-effectuated displacement of the body 40, for example from the first position to, or towards, the second position relative to the display screen 110. The set of buckling springs 250 is configured to bias the body 40 of the key 20 at the first position and to provide a resistance or resistive force associated with displacement of the body 40 from the first position to the second position. In several embodiments, the curvature of the buckling springs 250 can be selected and/or varied to control, select, and/or vary the quantity of resistive force or resistance associated with displacement of the body 40 from the first position to, or towards, the second position. The material used for construction, and/or the thickness of the material used for construction, of the buckling springs also affect the quantity of resistive force or resistance that is associated with displacement of the body 40 from the first position to, or towards, the second position.

FIG. 3C shows a buckling spring 250b of a different configuration to the bucking spring 250 of shown in FIG. 3B. The buckling spring 250b is shaped, dimensioned, and/or configured to provide a user with a tactile feedback upon, or associated with, user-effectuated displacement of the body 40, for example from the first position to, or towards, the second position relative to the display screen 110. The buckling spring 250b can help to bias the body 40 of the key 20 at the first position and to provide a resistance or resistive force associated with displacement of the body 40 from the first position to the second position. The different configuration (e.g., curvature) of the buckling spring 250b of FIG. 3C as compared to the buckling spring 250 of FIG. 3B can provide the bucking spring 250b of FIG. 3C with a different quantity of resistive force associated with displacement of the body 40 as compared to the buckling spring 250 of FIG. 3B.

Although particular different spring-related structures, mechanisms, or operations are described above in relation to particular embodiments of the present disclosure, it will be understood that other, or alternative, spring-related structures or mechanisms that include or share similar structural, functional, or operational characteristics are also included within the scope of the present disclosure. For instance, spring or spring-related structures or mechanisms of specific embodiments can be constructed of various different materials, for example metal-based, plastic or polymer-based, or rubber-based materials.

Various Aspects of Sheet Metal Scissor Mechanism

Figure 4A:
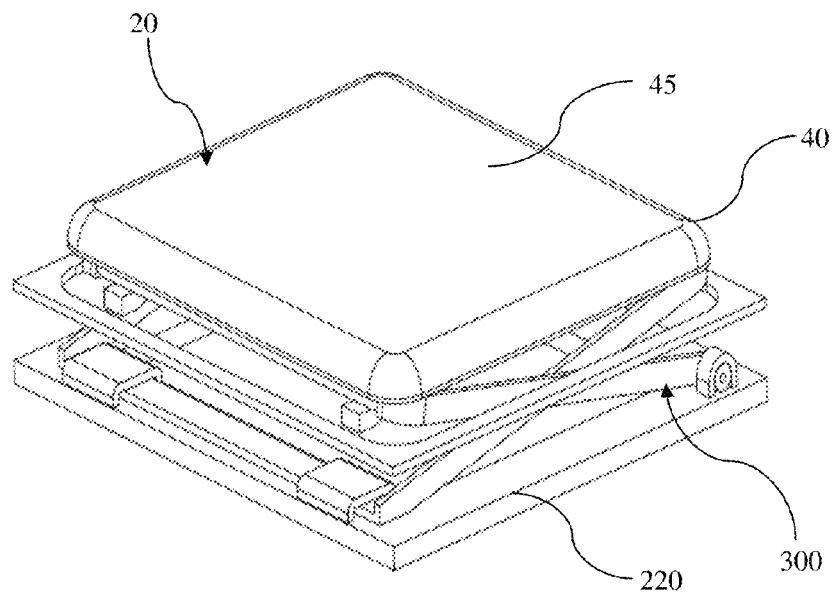
FIG. 4A shows a key including a body carried by a set of rotated balance springs in accordance with an embodiment of the present disclosure.
Figure 4B:
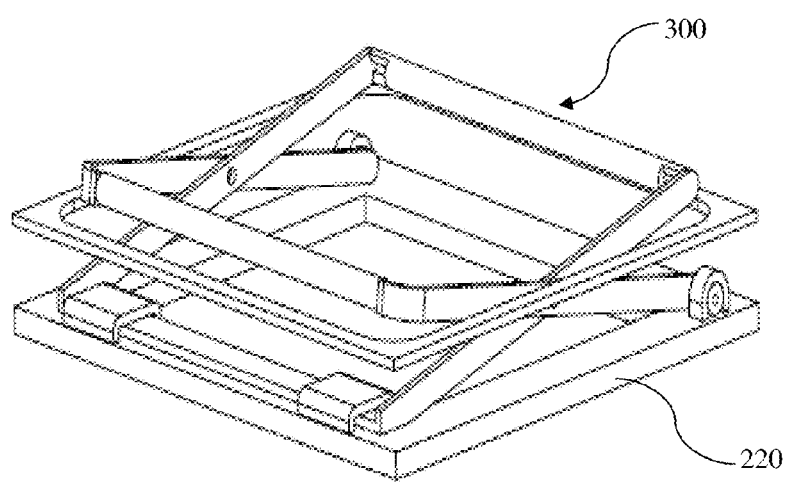
FIG. 4B shows an isometric view of the set of rotated balance springs of FIG. 4A.
Figure 4C:
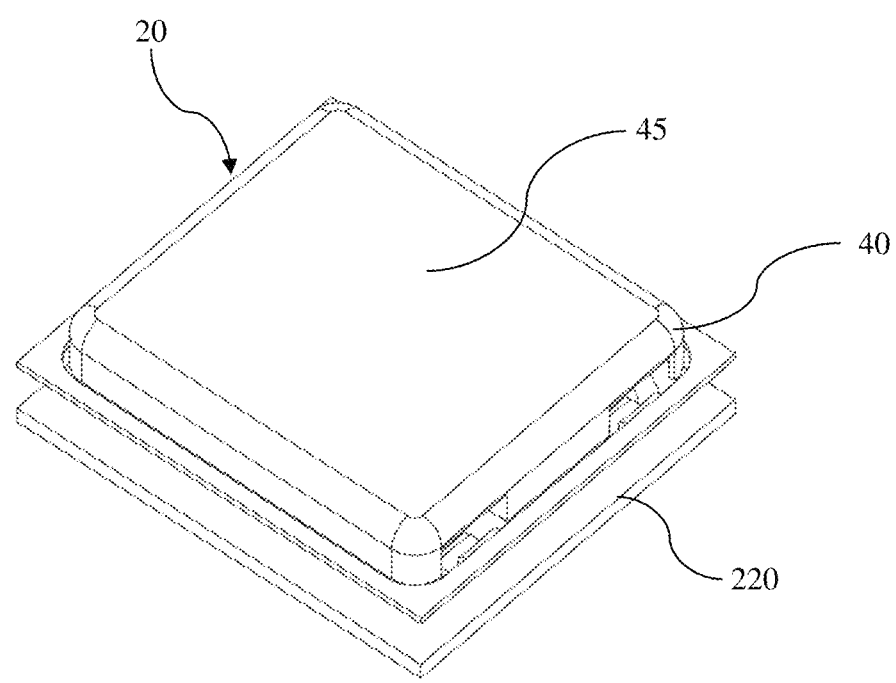
FIG. 4C is a top angled view of the key of FIG. 4A.

FIG. 4A to FIG. 4C show keys 20 that include a body 40 and a resilient structure 60 that includes, or is, a sheet metal scissor mechanism or structure 300.

The sheet metal scissor mechanism or structure 300, or at least a significant portion of the sheet metal scissor mechanism or structure 300, is positioned or disposed at a perimeter or periphery of the body 40, for example along the edges or sides of the body 40. In embodiments wherein the body 40 includes the light permeable portion, area, or surface 45, the sheet metal scissor mechanism or structure 300 can be configured and/or positioned to reduce or minimize obstruction or blockage of light transmitted through the light permeable portion, area, or surface 45.

The sheet metal scissor mechanism or structure 300 is configured to provide a user with a tactile feedback upon, or associated with, user-effectuated displacement of the body 40 relative to the display screen 110, for example from the first position to, or towards, the second position relative to the display screen 110. The sheet metal scissor mechanism or structure 300 is configured to bias the body 40 of the key 20 at the first position and to provide a resistance or resistive force associated with displacement of the body 40 from the first position to the second position. In several embodiments, the sheet metal scissor mechanism or structure 300 can be constructed using other resilient materials apart from metals. The material used for constructing the sheet metal scissor mechanism or structure 300 or a like mechanism or structure can be selected and/or varied in order to control (e.g., select and/or vary) the quantity of resistive force or resistance associated with displacement of the body 40 from the first position to, or towards, the second position.

The key 20, more specifically via the sheet metal scissor mechanism or structure 300 of the key, can be first coupled to, or mounted on, the carrier or support structure 220 before the being disposed relative to the display screen or display screen 110. The carrier or support structure 220 is located between the key 20 and the display screen 110 and can help to support the key 20, and the sheet metal scissor mechanism or structure 300 of the key 20, on the display screen 110.

Various Aspects of a Magnetic-Repulsion Type Mechanism

FIG. 5A and FIG. 5B show a magnetic-repulsion type mechanism 400 according to particular embodiments of the present disclosure. The magnetic-repulsion type mechanism 400 utilizes or provides an electromagnetic field for biasing the body 40 of a particular key 20 at the first position and for providing a resistance to displacement of the body 40 from the first position to or towards the second position.

In various embodiments, the key 20, more specifically the body 40 of the key 20 is coupled to, or includes, a set of magnets 410 (hereinafter referred to as key magnets 410). The resilient structure 60 of the key 20 can include the set of key magnets 410. The number of keys magnets 410 of each key 20 can be selected and/or varied as desired, for instance depending upon intended or target magnitude of resistive force (hence tactile feedback) associated with displacement of said key 20 from the first position to the second position. The set of key magnets 410 can be permanent magnets or electromagnets.

The set of key magnets 410 are configured to facilitate generation of an electromagnetic field. More specifically, the set of key magnets 410 are configured to facilitate or effectuate generation of an electromagnetic field with a set of magnets 420 or surface magnets 420. The set of surface magnets 420 are disposed relative to (e.g., across a surface of) the display screen 110. In several embodiments, the set of surface magnets 420 are carried by a carrier or support structure 130 as shown in FIG. 5A and FIG. 5B, wherein the carrier or support structure 130 can be coupled to the display screen 110.

The set of key magnets 410 of the key 20 functions or operates together with the set of surface magnets 420 of the display screen 110 to thereby generate an electromagnetic field between the key 20 and the display screen 110. The electromagnetic field helps to bias the key 20, more specifically the body 40 of the key 20, at the first position. In addition, the electromagnetic field generated between the set of key magnets 410 of the key 20 and the set of surface magnets 420 of the display screen 110 provides a resistance to displacement of the body 40 of the key 20 from the first position to or towards the second position.

In some embodiments, the set of key magnets 410 is a set of electromagnets. When the key magnets 410 are electromagnets, the set of surface magnets 420 that is associated with, or correspond to, said set of key magnets 410 (or electromagnets) is hence a set of permanent magnets. In other embodiments, the set of key magnets 410 is a set of permanent magnets. In such embodiments wherein the key magnets 410 are permanent magnets, the set of surface magnets 420 that is associated with, or correspond to, said set of key magnets 410 (or permanent magnets) will be a set of electromagnets.

The displacement of the body 40 of a particular key 20 between the first position and the second position causes or produces a change in the electromechanical field generated between the set of key magnets 410 of said key 20 and the set of surface magnets 420 corresponding to said key 20. Change(s) to the electromagnetic field can be detected by a hall-effect sensor 430.

In several embodiments, each key 20 as well as the set of key magnets 410 and the set of surface magnets 420 associated with said key 20 is associated with one hall-effect sensor 430. Therefore, where there are multiple keys 20 disposed relative to (e.g., across) the display screen 110, there are also a corresponding number of hall-effect sensors 430 (each hall-effect sensor 430 corresponding to one key 20) disposed relative to (e.g., across the display screen). The hall-effect sensors 430 can be carried by the carrier or support structure 130.

The hall-effect sensor 430 is configured to detect displacement of the body 40 of a particular key 20 to or towards the display screen 110 (e.g., displacement of the body 40 of said key 20 from the first position to, or towards, the second position). This is because a displacement of the body 40 between the first position and the second position causes an electromagnetic field change, which can be detected by the hall-effect sensor 430. The hall-effect sensor 430 can also be configured to facilitate or effectuate generation of electrical signal(s) that correlate to detected electromagnetic field change.

Examples of Optical Films

As described above, the body 40 of the key, more specifically the light permeable region, portion, or area 45 of the body 40 (or the image viewing area or window of the body 40), can be configured and/or constructed in order to provide the light permeable region 45 with an intended or target set of light transmission properties or characteristics.

In multiple embodiments of the present disclosure, the light permeable region 45 includes or is coupled to an optical film 452. For example, the light permeable region 45 can be overlaid onto the optical film 452. Alternatively, the optical film 452 can be coupled or molded to light permeable region 45 at or across a surface of the optical film 452 that is in closer, or closest, proximity to the display screen 110.

Examples of optical films include, but are not limited to, brightness enhancing film, a light turning film, a polarizer film, a diffuse blend reflective film, a magnifying film, a diffuser film, or a combination thereof. In certain embodiments of the present disclosure, the optical film includes a multilayer optical film that can include one or more distinct layers of the above-listed optical films. The optical film(s) of the light permeable portion can be selected and/or varied depending upon intended or target set of light transmission properties or characteristics for the light permeable region 45. For example, the optical film can be selected and/or varied for at least one of increasing the intensity of light and/or magnifying optical signals transmitted through the light permeable region 45.

In some embodiments of the present disclosure, the body 40, or the light permeable region 45 of the body 40, includes a light turning film. The light turning film included or incorporated into the body 40, or the light permeable region 45, can be selected based upon light travel direction changing properties thereof. In other words, the light turning film can be selected based upon the angle by which said light turning film redirects illumination (or light) passing therethrough.

In several embodiments, the light turning film of the key 20 is configured to increase an angle of light transmitted through the light permeable region 45. The light turning film can be configured such that an effective viewing area provided by, or through, the light permeable region 45 is at least approximately 90% of the actual area of the light permeable region 45. In various embodiments, the light turning film can be configured such that an effective viewing area provided by, or through, the light permeable region 45 is at least approximately 95% of the actual area of the light permeable region 45. In specific embodiments, the light turning film can be configured in such a manner as to increase the effective viewing area (as observed or viewed by a user of the key 20) beyond the actual area of the light permeable region 45. The light turning film can be configured to magnify the optical signals transmitted through the light permeable region 45.

Luminit's Direction Turning Film

Luminit's DTF (Direction Turning Film) is a non-symmetrical linear micro-prismatic that imparts a 20° shift in angle of a semi-collimated light source, for example of light emitted or supplied by a display screen such as an LCD screen. Luminit's DTF is made of a substrate of 0.010 polycarbonate and can be used, or is compatible with, LED light sources that utilizes secondary optics.

Brightness Enhancing Optical Films

Several brightness enhancing optical films are known in the art of optical films. Brightness enhancing films are generally prepared or made from high index of refraction polymerizable compositions.

U.S. Pat. No. 5,175,030 and U.S. Pat. No. 5,183,597 discloses a brightness enhancing film that can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (such as a PET film) and the master, at least one of which is flexible; and (d) curing the composition.

Although particular optical films are described above, it will be understood that alternative optical films can be used for providing the light permeable region 45 with alternative sets of light transmission properties.

Aspects of Key Assembly and System 100 Embodiments

Optically transmissive tactile key assemblies or systems 100 that include a plurality of the keys 20, buttons, or actuators described above in relation to particular embodiments of the present disclosure are provided in accordance with particular embodiments of the present disclosure. In some embodiments, the key assembly or system 100 includes both optically transmissive keys 20 (i.e., keys 20 that include the light permeable region 45) and optically opaque keys.

For example, FIG. 1A shows a schematic illustration of the display-capable keyboard assembly 100A (or keyboard-based optically transmissive tactile key assembly). In addition, FIG. 1B and FIG. 1C shows a schematic illustration of the display-capable computer mouse key assembly 100B.

The optically transmissive tactile key assemblies or systems 100 of embodiments of the present disclosure include a plurality of keys 20 coupled to, carried by, or disposed adjacent to or across a display screen or surface 110. In some embodiments, the display screen 110 can be a rigid display screen 110 (e.g., an LCD or LED based display screen). The rigid display screen 110 can be used with display-capable keyboard apparatuses 100A, such as that shown in FIG. 1A.

In other embodiments, the display screen 110 can be a flexible display screen 110 (e.g., an OLED based display screen). The flexible display screen 110 can be used with apparatuses or devices that may not include a planar, or substantially planar, external surface. For instance as shown in FIG. 1B and FIG. 1C, the flexible display screen 110 can be incorporated or included with a computer input device such as a computer mouse, for instance conforming, following, or substantially following a top or side surface contour or curvature of the computer mouse.

The flexible display screen 110 can also be incorporated or included into other computer input devices or electronic devices, for example game controllers (e.g., Nintendo Wii™ controller), joysticks, and mobile phones. In addition, the flexible display screen 110 can also be used with keyboards or other devices with a planar surface or structure. The use of the flexible display screen (e.g., OLED based display screen) with a keyboard can help to provide or achieve a thin, or very thin, keyboard and/or a flexible, foldable, or bendable keyboard.

As shown in FIG. 1A to FIG. 1C, a plurality of optically transmissive keys 20 can be disposed or positioned relative a display screen 110 in a number of rows. It will be understood that alternative arrangements or positions for the optically transmissive keys 20 relative to particular display screens 110 are also possible.

Optical signals or light emitted from the display screen 110 is transmissible through the light permeable region or surface 45 of the body 40 of the key 20. A viewer is able to view or see images (e.g., icons, figures, and alphanumeric characters) displayed by portions of the display screen 110 via or through corresponding light permeable surfaces, regions, or portions 45 of the keys 20. Based upon the images viewed through the light permeable surface 45 of a particular key 20, a user can more readily understand or recognize a function associated with said key 20 and/or be able to make a choice as to whether to actuate or displace said key 20.

The images displayed on display screen 110 are dynamically changeable or variable, for instance depending upon game scenarios occurring on a computing device (e.g., desktop or laptop computer) to which the display screen 110 is coupled to and/or based upon prior user's inputs, actuations, or selections. The display screen 110 can include or be coupled to a memory or a memory storage unit as well as appropriate display screen circuitry to facilitate or enable static and/or dynamic presentation of image data by portion(s) of the display screen 110. Image data (e.g., optical signals) output or displayed by the display screen 110, or selected portions of the display screen 110, can be selected and/or varied depending upon a set of programming instructions (e.g., corresponding to an application program, a set of device drivers, and/or firmware).

In some embodiments, the display screen 110 can be associated with, or can couple to or carry, the support or carrier structure or layer 130 that includes or carries the plurality of switches 120 (e.g., electromechanical switches 120). In some embodiments, more specifically in embodiments wherein the resistance (and corresponding tactile feedback) associated with body 40 displacement is provided by an electromagnetic field, the support or carrier structure 130 can be configured to carry a set of hall-effect sensors 430. The support or carrier structure 130 can be configured to provide structural strength and/or integrity for the plurality of switches 120 (e.g., electromechanical switches 120 or hall-effect sensors 430) carried thereby. In addition, the support or carrier structure 130 can help to interconnect the plurality of switches 120 (e.g., electromechanical switches 120 or hall-effect sensors 430) in such a manner as to facilitate or enable easier, simpler, and/or more accurate coupling of the plurality of switches 120 relative to the display screen 110.

In embodiments wherein the display screen 110 is incorporated into computer input device or electronic device, for example a keyboard, a computer mouse, a game controller, or a mobile phone, the region, area, or portion of computer input device or electronic device located between the display screen 110 and a surface (i.e., external surface) of said computer input device or electronic device is optically transmissive (i.e., light permeable). For example as shown in FIG. 1C, the region, area, or portion of the computer mouse between the flexible display screen 110 and the mouse surface is optically transmissive. This allows optical signals or light emitted from the flexible display screen 110 to travel to the mouse surface for emission therefrom.

In addition, a plurality of keys 20 can also be coupled to, or carried by, a key carrier or support structure prior to coupling of the plurality of keys 20 to the display screen 110 or the support structure 130 carrying the electromechanical switches 120. The key carrier structure can be configured to interconnect the plurality of keys 20. By interconnecting the plurality of keys 20, the key carrier structure can enhance ease, speed, simplicity, and/or accuracy coupling said plurality of keys 20 relative to the display screen 110 or to the support structure 130 carrying the electromechanical switches 120.

In several embodiments, the key carrier structure 130 is shaped, dimensioned, and/or configured to couple, attach, or fasten to the display screen 110 or to the support structure 130. For example, the key carrier structure can include a set of adhesives or adhesive elements configured to enable adhesion of the key carrier structure to the display screen 110 or to the support structure 130. Alternatively, or additionally, the key carrier structure 130 can include a set of grippers, or set of like attachment mechanisms or means, that is capable of gripping or attaching to the display screen 110 or to the support structure 130.

Each of the plurality of keys 20 also includes a resilient structure 60 that is configured to bias the key 20 at a distance from the display screen 110, for example at the first portion relative to the display screen 110. The key 20, more specifically, the body 40 of the key 20 can be displaced to, or towards, the surface 110, for example from the first position to, or towards, the second position. The resilient structure 60 is configured to provide a resistive force or resistance to the displacement of the body 40 of the key 20 can be displaced to, or towards, the display screen 110, for example from the first position to, or towards, the second position. Accordingly, the resilient structure 60 of the key 20 is configured to provide a tactile feedback to a user upon, or associated with, a user-effectuated displacement of the body 40 of said key 20.

The displacement of the key 20, more specifically the body 40 of the key 20, can effectuate a corresponding displacement of the switch actuator 80 (e.g., electromechanical switch actuator 80) of said key 20. The switch actuator 80 can be displaced to or towards a corresponding switch 120 (e.g., electromechanical switch 120) carried by, or disposed relative to, the display screen 110 for actuating said switch 120. In some embodiments, displacement of the body 40 can correspondingly displace the electromechanical switch actuator 80 to effectuate contact between the electromechanical switch actuator 80 and a corresponding electromechanical switch 120 that is carried by, or disposed relative or adjacent to, the display screen 110. Said contact can result in generation of electrical signals, which is transmissible to a computing device and hence providing user input into said computing device.

The optical transmissive key assembly or system 100, for instance the display-capable keyboard assembly 100A or the display-capable computer mouse key assembly 100B can be coupled to a computing system that includes a processor and a memory. The computing system is configured to execute stored program instructions corresponding to one or more application programs. Based upon application program execution, context, status or state, visual information (e.g., images, icons, text, and optical signals) can be generated or retrieved and directed to one or more portions, areas, or regions of the display screen 110. Accordingly, visual information displayed at specific portions, areas, or regions of the display screen 110 can be dependent upon the execution, context, status, or state of the application program.

Aspects of Processes or Methods for Manufacturing a Key 20

Figure 6:
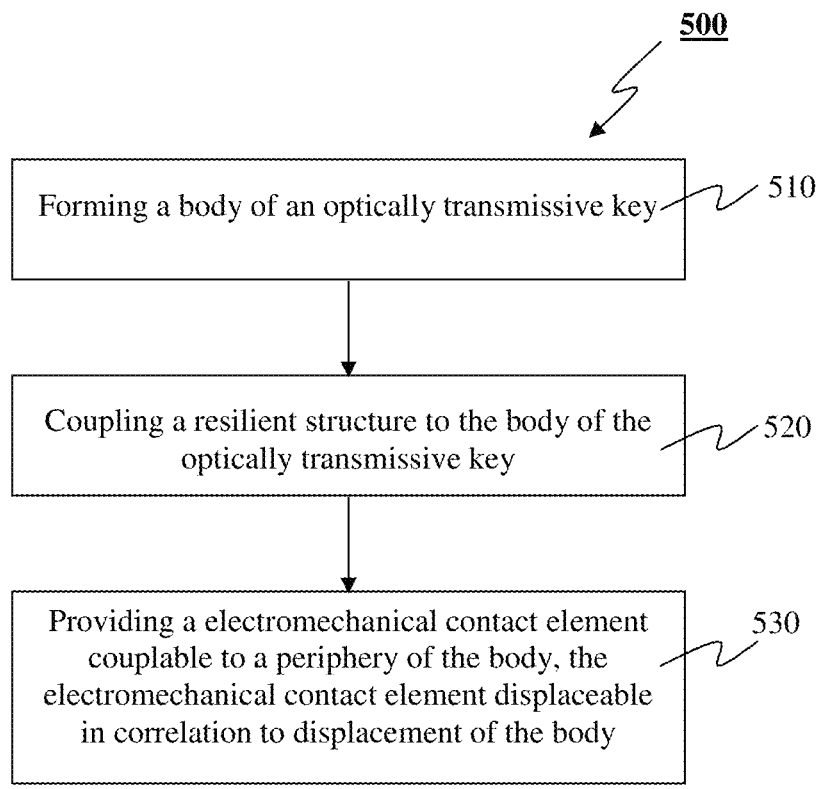
FIG. 6 is a flowchart of a process for manufacturing or producing the key in accordance with particular embodiments of the present disclosure.

FIG. 6 is a flowchart of a process 500 for manufacturing the key 20 in accordance with particular embodiments of the present disclosure.

In a first process portion 510, the body 40 of the key 20 is formed, produced, or constructed. In multiple embodiments, forming of the body 40 includes forming, constructing, incorporating, or coupling the optically transmissive or light permeable portion, area, or surface 45 to the body 40.

The light permeable portion or surface 45 of the body 40 can be shaped, dimensioned, and/or configured depending upon intended or desired light transmission properties or characteristics. The light permeable portion or surface 45 can be shaped, dimensioned, and/or configured in order to maximize or increase the area of the light permeable portion or surface 45 of the body 40. For example, the light permeable region 45 can be shaped, dimensioned, and/or constructed such that the area of the light permeable region 45 is at least approximately 75% of the area of the body 40. Alternatively, the light permeable region 45 can be shaped, dimensioned, and/or constructed such that the area of the light permeable region 45 is at least approximately 85%, or even at least approximately 95%, of the area of the body 40.

In several embodiments, the first process portion 510 also involves incorporating or including an optical film within the body 40, more specifically within the light permeable region or portion 45 of the body 40. The optical film can be selected and/or varied in order to provide the light permeable region 45 with an intended or target set of light transmission properties or characteristics. For example, the optical film can include, or be, a light turning film in order to select, determine, or change an angle of light travel through the light permeable region 45. In addition, or alternatively, the optical film can include, or be, a brightness enhancing optical film for increasing intensity of light transmitted through the light permeable region 45.

A second process portion 520 involves coupling a resilient structure 60 to the body 40 of the key 20. The resilient structure 60 can include, or be, the offset or remote pivot key mechanism 150, the set of balancing springs 200, the set of buckling springs 250, or the sheet metal scissor mechanism 300 as described above in relation to particular embodiments.

The resilient structure 60 is configured to provide a user with tactile feedback associated with, or upon, user-effectuated displacement of the body 40. As described above, in several embodiments, the key 20 can be coupled to, carried by, or disposed relative to a display screen 110 (e.g., a display screen or surface such as an LCD screen). The resilient structure 60 can be configured to bias the body 40 at the first position relative to the display screen 110. In addition, the resilient structure 60 can be configured to provide a resistive force, or resistance, to displacement of the body 40 to, or towards, the display screen 110 (e.g., from the first position to, or towards, the second position, wherein the second position is located at closer proximity to the display screen 110).

In several embodiments, the resilient structure 60 is positioned at a periphery of the body 40, for example at or along an edge or side of the body 40, or even away from or exterior an area defined by the body 40. In the second process portion 520, the resilient structure 60 can be coupled to the body 40 in a manner that minimizes or reduces obstruction or blockage by the resilient structure 60 to light transmission through the light permeable region 45 of the body 40. The resilient structure 60 can also be constructed with a material that allows light transmission, or partial light transmission, therethrough.

In a third process portion 530, the switch actuator 80, for instance the electromechanical switch actuator 80, is provided. The electromechanical switch actuator 80 can be coupled to the body 40, or to the resilient structure 60, of the key 20. In many embodiments, the electromechanical switch actuator 80 is positioned at a periphery, for example at an edge, side, or corner, of the body 40. The electromechanical switch actuator 80 is positioned to minimize or reduce obstruction or blockage to light transmission through the light permeable region 45 of the body 40.

The electromechanical switch actuator 80 can be displaced relative to the display screen 110. In multiple embodiments, the displacement of the body 40 relative to the display screen 110, for example between the first and second positions relative to the display screen 110, effectuates a corresponding displacement of the electromechanical switch actuator 80.

The displacement of the electromechanical switch actuator 80 of the key 20 towards the display screen 110 can facilitate or effectuate contact between the electromechanical switch actuator 80 and at least one switch 120, for example the electromechanical switch 120, carried by, or disposed relative to, the display screen 110. The electromechanical switch actuator 80 is configured such that contact with the electromechanical switch 120 generates electrical signals that are transmissible to a computing device. In multiple embodiments, the contact between the electromechanical switch actuator 80 of a particular key 20 and its corresponding electromechanical switch 120 occurs at a periphery of said key 20, for example at an edge or side of said key 20, or away from or external an area defined by said key's perimeter.

In particular embodiments wherein the electromechanical switch 120 is replaced by another type or model of switch, for example a hall effect sensor 430, electrical signals can be generated upon interaction of (e.g., the relative displacement between) the switch actuator 80 can said alternative type or model of switch (e.g., the hall effect sensor 430).

The switches 120 (e.g., the electromechanical switches 120) can be coupled to, carried by, or disposed adjacent to, relative, or along a surface of, the display screen 110. In some embodiments, a plurality of switches 120 is first coupled to or carried by a support or carrier structure 130. The support structure 130 that carries the plurality of switches 80 (e.g., electromechanical switches 120) can then be coupled to, mounted onto, or displaced relative to the display screen 110.

The key 20 can be coupled to, placed onto, carried by, or positioned or offset along a normal axis relative to the display surface or screen 110 (e.g., an LCD screen or surface). In many embodiments, multiple keys 20 can be coupled to, placed onto, carried by, or positioned or offset along a normal axis relative to the display surface or screen 110 (e.g., an LCD screen or surface). The plurality of keys 20 can be arranged as desired, for example in rows, relative to the display surface or screen 110.

Figure 7:
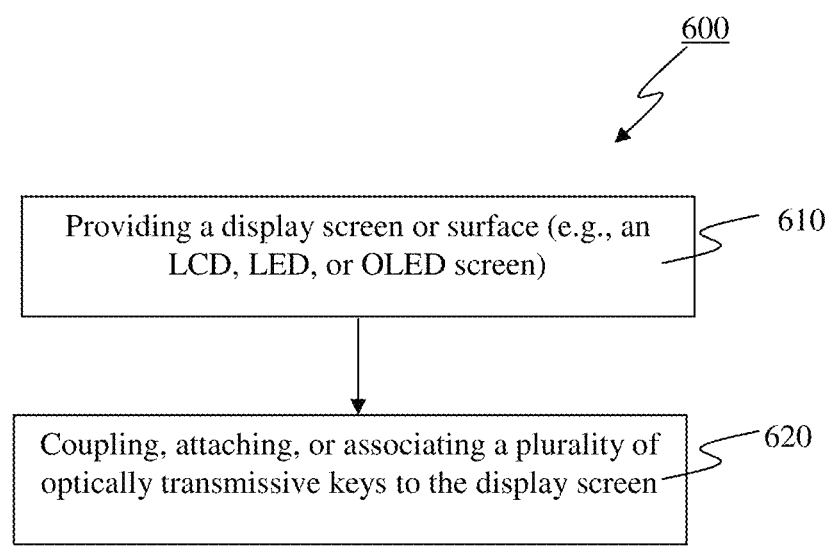
FIG. 7 is a flowchart of a process for manufacturing or assembling a system that includes a plurality of keys and a surface in accordance with particular embodiments of the present disclosure.

Aspects of Processes and Methods for Assembling or Producing a Key Assembly or System FIG. 7 is a flowchart of a process 600 for assembling a set of optically transmissible tactile keys 20, buttons, or actuators relative to a display screen 110 according to particular embodiments of the present disclosure. The process 600 facilitates or effectuates production, preparation, or manufacture of a key assembly or system 100, for example a display-capable keyboard assembly 100A or a display-capable computer mouse key assembly 100B.

In a first process portion 610, the display screen 110 is provided. The display screen 110 can be a rigid display screen (e.g., an LCD or LED based display) or a flexible display screen (e.g., an OLED based display screen) by which images (e.g., icons, alphanumeric characters, and figures) can be dynamically shown or displayed.

The display screen 110 is configured to output or display variable images (or optical signals). In several embodiments, the display screen 110 is configured to display different images at different time periods. The display screen 110 can include or be coupled to a memory or memory storage unit. The display screen 110 can include or be coupled to appropriate display screen circuitry to facilitate or effectuate presentation of static and/or dynamic image data by the display screen 110. The display screen 110 can be coupled to a computing system that includes a processor and a memory. Execution of program application(s), e.g., gaming application(s), stored in the memory can cause output of static and/or dynamic image data or optical signals by the display screen 110.

In several embodiments, the display screen 110 is coupled to, includes, carries, or is associated with, a set of switches 120 (e.g., electromechanical switches 1200. The set of electromechanical switches 120 can be directly coupled to the display screen 110. Alternatively, in certain embodiments, the set of electromechanical switches 120 can be coupled to, mounted onto, or disposed relative to, the display screen 110 via the carrier or support structure 130. The set of electromechanical switches 120 can be first assembled on, coupled to, or carried by the carrier or support structure 130 before coupling the carrier or support structure 130 (which includes or carries the set of electromechanical switches 120) onto the display surface 110.

In a second process portion 620, a set of keys 20 is coupled, assembled, or disposed relative to the display screen 110. The number of keys 20 of said set of keys 20 can be selected and varied as desired, and can be for example at least ten keys 20, at least twenty keys 20, at least forty keys 20, at least sixty keys 20, or more. The set of keys 20 can be directly coupled to the display screen 110. Alternatively, the set of keys 20 can be coupled to the display screen 110 via a key carrier or interposing structure. The key carrier or interposing structure can be the carrier or support structure that carries the electromechanical switches 120.

In some embodiments, the plurality of keys 20 are coupled to each other before or prior to assembly or attachment onto the display screen 110. For example, the plurality of keys 20 can be coupled or assembled onto a carrier structure, before coupling or assembling the carrier structure (including the plurality of keys 20 coupled thereto) to the display screen 110. Alternatively, each key 20 of the plurality of keys 20 can be individually coupled, assembled, or disposed relative to the display screen 110.

In some embodiments, the set of keys 20 are carried by, coupled to, or supported by a keyboard, for example to form the display-capable key assembly 100A. In other embodiments, the set of keys 20 are carried by, coupled to, or supported by a computer mouse housing, for example to form the display-capable computer mouse key assembly 100B.

As described above, each key 20 includes the body 40, the light permeable region or surface 45 coupled to or carried by the body 40, and the optical film (e.g., light turning film). In some embodiments, each key 20 further includes a resilient structure 60. In many embodiments, the resilient structure 60 is configured to bias the body 40 of the key 20 at a distance from the display screen 110, for example at the first position. In multiple embodiments, the body 40 is positioned parallel to the display screen 110. The light permeable region 45 of the body 40 can be positioned parallel, or at least substantially parallel, to the display screen 110. The body 40 can be offset along a normal relative to the display screen 110. The body 40 is displaceable relative to the display screen 110, for instance from the first position to, or towards, the second position, wherein the second position is located at closer proximity to the display screen 110 as compared to the first position.

The displacement (e.g., user-effectuated displacement) of the body 40 of a particular key 20 facilitates or effectuates a corresponding displacement of the electromechanical switch actuator 80 of said key 20. More specifically, the displacement of the body 40 of a particular key 20 to, or towards, display screen 110 (e.g., from the first position to, or towards, the second position) facilitates or effectuates a corresponding displacement of the electromechanical switch actuator 80 of said key 20 towards the display screen 110. This displacement of the electromechanical switch actuator 80 towards the display screen 110 can effectuate actuation of at least one corresponding electromechanical switch 120.

The resilient structure 60 is configured to provide a resistive force or resistance associated with the displacement of the body 40, more specifically displacement of the body 40 from the first position to or towards the second position. Accordingly, the resilient structure 60 is configured to provide a tactile feedback associated with, or upon, displacement of the body 40, and hence the electromechanical switch actuator 80 of the key 20, from the first position to or towards the second position. The light transmission properties or characteristics of the light permeable region 45 can be dependent upon a set of optical properties of the light turning film.

Specific examples of keys and key assemblies or systems provided by particular embodiment of the present disclosure are described below. However, it will be understood that the scope of the present disclosure is not limited in any way by the examples described below. The examples provided are solely for aiding or enabling the reader to have a better understanding and/or appreciation of particular embodiments of the present disclosure.

Example One

A displaceable actuator or button that can be disposed relative to an optical display screen. The optical display screen is configured for displaying variable image content. Different images can be displayed at specific portion(s) or area(s) of the optical display screen at different time periods. The optical display screen can be a rigid display screen (e.g., an LCD or LED based screen) or a flexible display screen (e.g., an OLED display screen). The optical display screen can be carried by, or incorporated within, a computer mouse or a keyboard. More specifically, the optical display screen can be disposed at or proximal to the surface of either a computer mouse or a keyboard. A plurality of switches is disposed relative to the optical display screen. The switches are electromechanical switches that are configured to enable generation of electrical signals.

The displaceable actuator includes a body, an offset or remote pivot mechanism or structure, and a switch actuator (otherwise known as an electromechanical contact element). The body includes a perimeter that defines an area of the body. The perimeter of the body can be referred to as a frame of the body. In addition, the body includes a light permeable or transmissive surface. The light permeable region includes an image viewing area through which variable images displayed or provided by the optical display screen can be transmitted. The image viewing area of the body allows a user to view variable images that are displayed at a portion of the optical display screen corresponding to the image viewing area. The image viewing area is at least 75% of the light permeable region. It will be understood that the image viewing area can be increased to at least approximately 85%, or even approximately 95%, of the light permeable region.

The offset pivot mechanism or structure of the displaceable actuator or button includes a support portion and a pivoting portion. The support portion is shaped and configured to couple to the perimeter (or frame) of the body. More specifically, the support portion is shaped and configured to couple to one or more side edge(s) of the body. The support portion is shaped and configured to minimize or reduce obstruction to light transmission through the image viewing area of the body.

The pivoting portion is configured to define a pivot axis (or pivoting axis). The pivot axis is located at a distance away from, or external to, the area of the body. Therefore, the pivot axis can be referred to as an offset or remote pivot axis. The body is displaceable, i.e., pivotable or rotable, about the pivot axis. A user-effectuated displacement of the body causes a rotation or pivot of the body about the pivot axis.

The body is pivotable between a first position and a second position relative to the optical display screen. The second position is located in closer proximity to the optical display screen as compared to the first position. The displacement or pivot of the body from the first position to the second position brings the switch actuator (i.e., the electromechanical contact element) into contact with an electromechanical switch. The contact between the switch actuator (or electromechanical contact element) of the displaceable actuator and the electromechanical switch can trigger generation of electrical signal(s).

The offset pivot mechanism or structure is configured to reduce or minimize obstruction to light transmission through the image viewing area. The offset pivot mechanism or structure can be constructed from, or can include, a sheet metal spring. Alternatively, the offset pivot key mechanism can be constructed from, or can include, other resilient materials or structures.

The offset pivot mechanism or structure is configured to dispose the body at the first position. As mentioned above, the body can be displaced, more specifically pivoted or rotated, between the first position and the second position. Displacement of the body from the first position towards the second position correspondingly displaces the body towards the optical display screen (i.e., closer to the optical display screen. The offset pivot mechanism or structure is configured to provide a resistance or resistive force associated with the displacement, more specifically the pivoting or rotation about the pivot axis, of the body from the first position to the second position. Where a user effectuates displacement, more specifically pivot or rotation, of the body from the first position to the second position, the offset pivot mechanism or structure can provide the user with a tactile feedback associated with said user-effectuated displacement of the body.

The displaceable actuator can support, enable, or allow rapid, or significantly rapid, consecutive actuations or displacements (e.g., pivots or rotations) thereof, more specifically of the body of the displaceable actuator. For example, the displaceable actuator can be configured to support, allow, or enable more than 50, 75, 100, 150, or even more consecutive actuations per minute. In other words, the displaceable actuator can be configured to support, allow, or enable a low, or very low, latency. For instance, the displaceable actuator be associated with a latency of less than approximately 2 ms, 1 ms, 0.5 ms, or less latency (time required between consecutive displacements and corresponding generation of electrical signals). Tactile feedback or response can be provided for each actuation or displacement (e.g., pivot or rotation) of the displaceable actuator. The ability to provide rapid consecutive and/or distinct tactile feedback for each consecutive actuation or displacement of the displaceable actuator is desirable and/or advantageous for particular applications, for instance gaming applications. In addition, the tactile feedback provided to the user upon each consecutive user-effectuated actuation or displacement (e.g., pivot or rotation) of a displaceable actuator can be immediate, or substantially immediate.

The switch actuator (or electromechanical contact element) and/or the offset pivot mechanism or structure of the displaceable actuator can be positioned and/or configured to minimize or reduce obstruction or blockage of light transmission through the image viewing area. The position of the switch actuator (or electromechanical contact element) and/ or the offset pivot mechanism or structure can be such that the user-visibility of variable images displayed by the display screen through the image viewing area is enhanced.

The light permeable region can include one or more optical films to enhance optical or light transmissibility through the image viewing area. The light permeable region can include an optical or light turning film for increasing the angle of light transmitted through the image viewing area.

Example Two

A keyboard-based system including a set of keys and an optical display screen. The set of keys can be arranged in an array relative to (or across) a surface of the keyboard. The optical display screen is configured for displaying variable image content. Different images can be displayed at specific portion(s) or area(s) of the optical display screen at different time periods. The optical display screen can be a rigid display screen (e.g., an LCD or LED based screen) or a flexible display screen (e.g., an OLED display screen). The optical display screen can be disposed at or proximal to the surface of the keyboard. The system also includes a plurality of switches is disposed relative to the optical display screen.

Each key includes a body and a set of magnets (hereinafter referred to as key magnets). The body includes a perimeter that defines an area of the body. In addition, the body includes a light permeable or transmissive surface. The light permeable region can be referred to as an image viewing area through which variable images displayed or provided by the optical display screen can be transmitted. The light permeable region or the image viewing area of the body allows a user to view variable images that are displayed at a portion of the optical display screen corresponding to the image viewing area. The area of the light permeable region is at least 75% of the body's area. However, it will be understood that the area of the light permeable region can be increased to at least approximately 85%, or even approximately 95%, of the body's area.

The light permeable region of each key can include one or more optical films depending upon desired or target light transmission properties or characteristics of the image viewing area. For example, the light permeable region of a particular key can include an optical or light turning film configured to increase an angle of light transmitted through the image viewing area of said key. In addition, or alternatively, the light permeable region of a particular key can include an optical film configured to increase intensity of light transmitted through the image viewing area of said key.

The system also includes multiple sets of surface magnets. The sets of surface magnets are disposed relative to, or are carried by or coupled to, the optical display screen. The number of sets of surface magnets corresponds to the number of keys disposed relative to the optical display screen. This is to say, each set of surface magnets is associated with, or corresponds to, one key.

The set of key magnets of a particular key and the associated set of surface magnets generate or produce an electromagnetic field therebetween. More specifically, the set of key magnets of a particular key and the associated set of surface magnets generate or produce an electromechanical field between said key and the optical display screen. The electromagnetic field biases the key at a distance away from the optical display screen. The electromagnetic field biases the key, more specifically the body of the key, at a first position (which is located at a distance away from the optical display screen). The body of the key can be displaced from the first position to a second position, which is located in closer proximity to the optical display screen as compared to the first position.

The displacement of a particular key from the first position to, or towards, the second position changes the electromagnetic field that has been generated between the set of key magnets of said key and the associated set of surface magnets of the optical display screen. The electromagnetic field provides a resistance or resistive force associated with the displacement of the key, more specifically the body of the key, from the first position to or towards the second position. This resistive force provides a user with a tactile feedback upon user-effectuated displacement of the key, more specifically body of the key, from the first position to or towards the second position.

Each switch of the plurality of switches are configured to detect change(s) to the electromagnetic field present between the set of key magnets of a particular key and its associated set of surface magnets. In many embodiments, the switches are, or include, hall-effect sensors. Detection of change(s) to the electromagnetic field between the set of key magnets of a particular key and its associated set of surface magnets triggers or results in a generation of electrical signal(s) by the switch associated with said key.

The keys can support, enable, or allow rapid, or significantly rapid, consecutive actuations or displacements thereof, more specifically of the bodies of said keys, for example more than 50, 75, 100, 150, or even more consecutive actuations or displacements per minute. Tactile feedback or response can be provided for each actuation or displacement of the key, more specifically body of the key. Tactile feedback is provided by the electromagnetic field generated between individual keys and the optical display screen (more specifically the set of key magnets of a particular key and the corresponding set of surface magnets of the optical display screen). The ability to provide rapid consecutive and/or distinct tactile feedback for each consecutive actuation or displacement of a particular key is desirable and/or advantageous for particular applications, for instance gaming applications.

Many embodiments of the present disclosure relate to optically transmissive keyboard assemblies and optically transmissive computer mouse key assemblies. More particularly, many embodiments of the present disclosure relate to keys, buttons, and actuators (e.g., optically transmissive keys, buttons, and actuators) that can be coupled to, carried by, or disposed relative to, a surface, for example a display screen or surface such as an LCD, LED, or OLED based display screen. In several embodiments, the key is suited, or well-suited, for applications involving reception of high frequency user input (e.g., user effectuated actuations), for example gaming applications for which feel or sensation provided to a user in response to key depression or displacement very closely resembles, or is an exact counterpart to, widely used user-input devices (e.g., gaming keyboard or mouse).

The key includes a body, a resilient structure, and a switch actuator (e.g., an electromechanical contact element). In many embodiments, the body includes an optically transmissive or light permeable surface, portion, area, or region. Light is transmissible through the light permeable region of the body. An optical film (e.g., light turning film) is coupled to or carried by the light permeable region. Light transmission properties of the light permeable region can be selected and/or varied depending upon a set of optical properties of the optical film (e.g., light turning film). The optical film can be configured to enhance intensity of light transmitted through the light permeable region and/or magnify optical signals transmitted through the light permeable region. In several embodiments, the light turning film of the key can be configured to increase an angle of light transmitted through the light permeable region.

When the key is coupled to, carried by, or disposed relative to the display screen, a portion or area of the display screen that corresponds to the light permeable region can be viewed or seen through the light permeable region. The key, more specifically the body of the key, can be actuated or displaced relative to the display screen, for example to or towards the display screen, depending upon what a user views or sees through the light permeable region of said key. The display screen can be configured to display or output variable images, image content, or optical signals at different times. Therefore, images or optical signals transmitted though the light permeable region of the body are selectable and/or variable.

The resilient structure is configured to provide the user with a tactile feedback associated with, or upon, displacement (e.g., user-effectuated displacement) of the body to or towards the display screen, for instance displacement from the first position to or towards the second position. This tactile feedback can be desirable or advantageous for particular applications, for instance gaming applications. The tactile feedback can be immediately, or substantially immediately, provided upon a displacement of the body of the key. In many embodiments, the key can be consecutively displaced at a rapid, or substantially rapid, rate, for example at more than 50, 100, 150, or even more displacements or actuations per minute. In other words, the key can be associated with a short, or even very short, latency period between consecutive key displacement-effectuated switch actuations. This short, or very short, latency period between consecutive key displacement-effectuated switch actuations can be significant and/or surprising. In multiple embodiments, each consecutive user-effectuated displacement or actuation of the key is associated with a separate and/or distinct tactile feedback. The ability to provide rapid consecutive distinct tactile feedback can be highly desirable or advantageous, for example for gaming applications.

The switch actuator (e.g., electromechanical contact element) of each key is positioned or disposed at or along a perimeter of the body of said key, for example at an edge, side, or corner of the body, or even away from, or external to, an area defined by the perimeter of the body. In many embodiments, the electromechanical contact element is positioned or disposed to minimize or reduce obstruction or blockage of light transmission through the light permeable region of the body. The electromechanical contact element of a particular key can be displaced in correlation with the displacement of the body of said key. Displacement of the electromechanical contact element can facilitate or effectuate contact between the electromechanical contact element and its corresponding switch (e.g., electromechanical switch) for generating or producing electrical signals that can be transmitted to a computing device.

Various types of user input devices, for example computer mouse, gaming consoles, game controllers (e.g., hand-held game controllers), and mobile phones configured for providing optical signals to users by way of keys as described above are also provided by various embodiments of the present disclosure. Optically transmissive assemblies for display capable keyboards, keypads, or other user input devices are also included within the scope of the present disclosure.

Particular embodiments of the disclosure are described above for addressing at least one of the previously indicated problems. While features, functions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed structures, features and functions, or alternatives thereof, may be desirably combined into other different devices, systems, or applications. The above-disclosed structures, features and functions, or alternatives thereof, as well as various presently unforeseen or unanticipated alternatives, modifications, variations or improvements thereto that may be subsequently made by one of ordinary skill in the art, are encompassed by the following claims.

The invention claimed is:

1. A device comprising:
a body comprising a light permeable region, the body configured to be resiliently displaceable between a first position and a second position relative to a surface, the second position located in closer proximity to the surface than the first position;
a switch actuator disposed external to an area of the light permeable region defined by the light permeable region's perimeter, the switch actuator displaceable towards the surface in response to displacement of the body; and
an optical film carried by or coupled to the light permeable region of the body, wherein an angle of light transmitted through the light permeable region is at least partially dependent upon a set of optical properties of the optical film;
wherein the optical film is configured to enhance intensity of light transmitted through the light permeable region.

2. The device as in claim 1, wherein the surface is associated with a set of electromechanical switches, and wherein the displacement of the body to the second position correspondingly displaces the switch actuator to thereby one of facilitate and effectuate actuation of at least one electromechanical switch of the set of electromechanical switches associated with the surface.

3. The device as in claim 2, wherein each electromechanical switch supports actuation of at least one electromechanical switch with a latency period of less than approximately 1 ms.

4. The device as in claim 1, further comprising a resilient structure coupled to the body, the resilient structure configured to bias the body at the first position and to provide a resistance associated with displacement of the body from the first position towards the second position.

5. The device as in claim 4, wherein the resilient structure comprises an offset pivot structure coupled to the body, the offset pivot structure defining a pivot axis positioned external to the area of the light permeable region of the body, the body pivoted about the pivot axis during displacement of the body between the first position and the second position.

6. The device as in claim 4, wherein the resilient structure comprises a set of springs coupled to the body, the set of springs configured to bias the body at the first position and provide a resistance to the displacement of the body from the first position towards the second position.

7. The device as in claim 4, wherein at least a substantial portion of the resilient structure is positioned external to the area of the light permeable region of the body.

8. The device as in claim 1, further comprising a set of magnets configured to one of facilitate and effectuate establishment of a magnetic field between the body and the surface, the magnetic field biasing the body at the first position and providing a resistive force associated with displacement of the body from the first position towards the second position.

9. The device as in claim 8, wherein the surface one of carries and is associated with at least one sensor configured to detect a magnetic field change caused by displacement of the body from the first position to the second position, the at least one sensor further configured to one of facilitate and effectuate generation of an electrical signal upon detection of the magnetic field change.

10. The device as in claim 9, wherein the at least one sensor is a hall-effect sensor.

11. The device as in claim 1, wherein the optical film is a light turning film, the light turning film configured such that an effective viewing area through the light permeable region is at least approximately 90% of the actual area of the light permeable region.

12. The device as in claim 1, wherein the optical film is configured to magnify optical signals transmitted through the light permeable region.

13. The device as in claim 1, wherein the switch actuator is a micro switch actuator.

14. The device as in claim 1, wherein the switch actuator is an electromechanical switch actuator.

15. The device as in claim 1, wherein the surface is an optical display screen configured to output variable image content.

16. The device as in claim 1, wherein the area of the light permeable region is at least approximately 85% of the body's area.

17. The device as in claim 16, wherein the light permeable region is configured to transmit variable image content provided by an area of the optical display screen corresponding to the light permeable region.

18. The device as in claim 1, wherein the switch actuator is positioned to one of reduce and minimize obstruction to light transmission through the light permeable region.

19. The device as in claim 1, wherein the device is one of a mouse button couplable to a computer mouse and a key couplable to a keyboard.

* * * * *